US009395905B2

(12) United States Patent
Wherry

(10) Patent No.: US 9,395,905 B2
(45) Date of Patent: Jul. 19, 2016

(54) GRAPHICAL SCROLL WHEEL

(75) Inventor: Elaine Wherry, San Jose, CA (US)

(73) Assignee: Synaptics Incorporated, San Jose, CA (US)

(*) Notice: Subject to any disclaimer, the term of this patent is extended or adjusted under 35 U.S.C. 154(b) by 1812 days.

(21) Appl. No.: 11/696,528

(22) Filed: Apr. 4, 2007

(65) Prior Publication Data

US 2007/0236475 A1 Oct. 11, 2007

Related U.S. Application Data

(60) Provisional application No. 60/789,685, filed on Apr. 5, 2006.

(51) Int. Cl.
*G06F 3/0488* (2013.01)
*H04M 1/23* (2006.01)
*G09G 5/34* (2006.01)
(Continued)

(52) U.S. Cl.
CPC .......... *G06F 3/04883* (2013.01); *G06F 3/0485* (2013.01); *G06F 1/169* (2013.01); *G06F 3/0362* (2013.01); *G06F 3/0482* (2013.01); *G06F 3/0488* (2013.01); *G06F 3/04855* (2013.01); *G06F 3/04886* (2013.01); *G06K 9/00026* (2013.01); *G09G 5/34* (2013.01); *H04M 1/233* (2013.01); *Y10S 715/973* (2013.01); *Y10S 715/975* (2013.01)

(58) Field of Classification Search
CPC . G06F 3/0485; G06F 3/0488; G06F 3/04855; H04M 1/233; G09G 5/34; G06K 9/00026; Y10S 715/973; Y10S 715/974
USPC .................. 715/702, 864, 733, 810, 835, 857
See application file for complete search history.

(56) References Cited

U.S. PATENT DOCUMENTS

| 4,264,903 A | 4/1981 | Bigelow |
| 4,736,191 A | 4/1988 | Matzke et al. |

(Continued)

FOREIGN PATENT DOCUMENTS

| CA | 2316104 | 2/2001 |
| EP | 0226716 | 7/1987 |

(Continued)

OTHER PUBLICATIONS

AppleInsider_Print_New Apple filing details virtual input touch-screen in, Feb. 21, 2006.*

(Continued)

*Primary Examiner* — Jeffrey A Gaffin
*Assistant Examiner* — John M Heffington
(74) *Attorney, Agent, or Firm* — Osha Liang LLP

(57) ABSTRACT

A touch screen interface including a display screen, a touch sensor device, and a processor coupled to the display screen and the touch sensor is described. The touch sensor device is adapted to sense object motion in a sensing region that overlaps at least part of the display screen. The processor is adapted to cause a scroll wheel that indicates a scrolling path to appear on the display screen selectively, such as in response to the touch sensor sensing object motion that corresponds to a scrolling initiation gesture. The processor is further adapted to cause scrolling on a display screen selectively, such as in response to the touch sensor sensing subsequent object motion along the scrolling path after the touch sensor has sensed the object motion corresponding to the scrolling initiation gesture.

30 Claims, 8 Drawing Sheets

(51) Int. Cl.
| | |
|---|---|
| G06F 3/0485 | (2013.01) |
| G06F 3/0482 | (2013.01) |
| G06K 9/00 | (2006.01) |
| G06F 3/0362 | (2013.01) |
| G06F 1/16 | (2006.01) |

(56) References Cited

U.S. PATENT DOCUMENTS

| | | | |
|---|---|---|---|
| 4,914,624 A * | 4/1990 | Dunthorn | 345/173 |
| 4,951,036 A | 8/1990 | Grueter et al. | |
| 5,159,159 A | 10/1992 | Asher | |
| 5,313,229 A | 5/1994 | Gilligan et al. | |
| 5,392,388 A | 2/1995 | Gibson | |
| 5,432,531 A | 7/1995 | Calder et al. | |
| 5,438,149 A | 8/1995 | Halfon et al. | |
| 5,438,331 A | 8/1995 | Gilligan et al. | |
| 5,452,413 A | 9/1995 | Blades | |
| 5,453,761 A | 9/1995 | Tanaka | |
| 5,455,906 A | 10/1995 | Usuda | |
| 5,472,116 A | 12/1995 | Barbe et al. | |
| 5,485,171 A | 1/1996 | Copper et al. | |
| 5,491,706 A | 2/1996 | Tagawa et al. | |
| 5,508,703 A | 4/1996 | Okamura et al. | |
| 5,530,455 A | 6/1996 | Gillick et al. | |
| 5,543,590 A | 8/1996 | Gillespie et al. | |
| 5,546,106 A | 8/1996 | Walgers | |
| 5,581,681 A | 12/1996 | Tchao et al. | |
| 5,633,660 A | 5/1997 | Hansen et al. | |
| 5,650,597 A | 7/1997 | Redmayne | |
| 5,659,333 A | 8/1997 | Okishima | |
| 5,748,185 A | 5/1998 | Stephan et al. | |
| 5,771,280 A | 6/1998 | Johnson | |
| 5,781,178 A | 7/1998 | Roehm et al. | |
| 5,788,288 A | 8/1998 | Jostein | |
| 5,808,602 A | 9/1998 | Sellers | |
| 5,825,352 A | 10/1998 | Bisset et al. | |
| 5,880,411 A | 3/1999 | Gillespie et al. | |
| 5,889,236 A | 3/1999 | Gillespie et al. | |
| 5,903,229 A | 5/1999 | Kishi | |
| 5,912,661 A | 6/1999 | Siddiqui | |
| 5,943,052 A | 8/1999 | Allen et al. | |
| 6,057,826 A | 5/2000 | Gaultier et al. | |
| 6,067,075 A | 5/2000 | Pelanek | |
| 6,169,548 B1 * | 1/2001 | Haynes | 715/857 |
| 6,243,071 B1 | 6/2001 | Shwarts et al. | |
| 6,266,050 B1 | 7/2001 | Oh et al. | |
| 6,271,824 B1 | 8/2001 | Chang | |
| 6,278,443 B1 * | 8/2001 | Amro | G06F 3/038 178/18.01 |
| 6,300,939 B1 | 10/2001 | Decker et al. | |
| 6,310,610 B1 * | 10/2001 | Beaton et al. | 345/173 |
| 6,362,842 B1 * | 3/2002 | Tahara et al. | 715/856 |
| D457,149 S | 5/2002 | Arpe | |
| 6,459,424 B1 | 10/2002 | Resman | |
| 6,486,896 B1 | 11/2002 | Ubillos | |
| D469,109 S | 1/2003 | Andre et al. | |
| D472,245 S | 3/2003 | Andre et al. | |
| 6,556,222 B1 | 4/2003 | Narayanaswami | |
| 6,570,557 B1 | 5/2003 | Westerman et al. | |
| 6,639,584 B1 | 10/2003 | Li | |
| 6,744,427 B2 | 6/2004 | Maglio et al. | |
| 6,771,280 B2 | 8/2004 | Fujisaki et al. | |
| 6,781,576 B2 | 8/2004 | Tamura | |
| 6,788,288 B2 | 9/2004 | Ano | |
| 7,143,355 B2 * | 11/2006 | Yamaguchi et al. | 715/733 |
| 7,506,275 B2 | 3/2009 | Conradt et al. | 715/857 |
| 7,653,883 B2 * | 1/2010 | Hotelling | G06F 3/0485 715/863 |
| 8,239,784 B2 * | 8/2012 | Hotelling | G06F 3/0418 345/173 |
| 2002/0101458 A1 | 8/2002 | SanGiovanni | |
| 2002/0149566 A1 | 10/2002 | Sarkissian | |
| 2002/0191029 A1 | 12/2002 | Gillespie et al. | |
| 2002/0196238 A1 * | 12/2002 | Tsukada et al. | 345/173 |
| 2003/0048262 A1 | 3/2003 | Wu et al. | |
| 2003/0076301 A1 | 4/2003 | Tsuk et al. | |
| 2003/0076303 A1 | 4/2003 | Huppi | |
| 2003/0076306 A1 | 4/2003 | Zadesky et al. | |
| 2003/0095096 A1 | 5/2003 | Robbin et al. | |
| 2003/0164818 A1 | 9/2003 | Miller-Smith | |
| 2003/0174149 A1 | 9/2003 | Fujisaki et al. | |
| 2003/0210286 A1 | 11/2003 | Gerpheide et al. | |
| 2004/0021694 A1 | 2/2004 | Doar | |
| 2004/0104898 A1 | 6/2004 | Badarneh | |
| 2004/0252109 A1 | 12/2004 | Trent, Jr. et al. | |
| 2005/0134578 A1 * | 6/2005 | Chambers et al. | 345/184 |
| 2005/0156898 A1 | 7/2005 | Yoshioka | |
| 2005/0168443 A1 | 8/2005 | Ausbeck, Jr. | |
| 2005/0168489 A1 | 8/2005 | Ausbeck, Jr. | |
| 2006/0026521 A1 * | 2/2006 | Hotelling et al. | 715/702 |
| 2006/0026535 A1 * | 2/2006 | Hotelling et al. | 715/863 |
| 2006/0026536 A1 | 2/2006 | Hotelling et al. | |
| 2006/0033724 A1 | 2/2006 | Chaudhri et al. | |
| 2006/0053387 A1 | 3/2006 | Ording | |
| 2006/0085757 A1 | 4/2006 | Andre et al. | |
| 2006/0097991 A1 * | 5/2006 | Hotelling et al. | 345/173 |
| 2006/0161870 A1 | 7/2006 | Hotelling et al. | |
| 2006/0161871 A1 | 7/2006 | Hotelling et al. | |
| 2006/0187216 A1 | 8/2006 | Trent, Jr. et al. | |

FOREIGN PATENT DOCUMENTS

| | | |
|---|---|---|
| EP | 0707280 | 4/1996 |
| EP | 0880091 | 11/1998 |
| JP | 59114628 | 7/1984 |
| JP | 59119406 | 7/1984 |
| JP | 63073415 | 4/1988 |
| JP | 5289811 | 11/1993 |
| JP | 6243253 | 9/1994 |
| JP | 7005969 | 1/1995 |
| JP | 7121291 | 5/1995 |
| JP | 9230993 | 9/1997 |
| JP | 11105646 | 4/1999 |
| JP | 11194863 | 7/1999 |
| JP | 11194883 | 7/1999 |
| JP | 11232026 | 8/1999 |
| JP | 2001109571 | 4/2001 |
| JP | 2004514203 | 5/2004 |
| WO | 02/31641 | 4/2002 |
| WO | 03/088176 | 10/2003 |
| WO | 2005/072350 | 8/2005 |
| WO | 2005/073954 | 8/2005 |

OTHER PUBLICATIONS

Touchscreen iPod interface with virtual scrollwheel on Flickr—Photo Sharin, Feb. 9, 2006.*
Virtual_scroll_wheel_Apple Insider Aug. 7, 2012.*
Bing search q=virtual+graphical+scroll+wheel&src Mar. 17, 2016.*
Friedlander et al.; "Bullseye! When Fitts' Law Doesn't Fit"; CHI 98; Apr. 18-23, 1998; pp. 257-264; Los Angeles, California USA.
Kobayashi et al.; "Dynamic Soundscape: Mapping Time to Space for Audio Browsing"; CHI 97; Mar. 22-27, 1997; pp. 194-201; Atlanta, Georgia USA.
Smith et al.; "Generalized and Stationary Scrolling"; CHI Letters vol. 1,1; 1999; pp. 1-9; Asheville, North Carolina USA.
Evans et al.; "Tablet-Based Valuators that Provide One, Two, or Three Degrees of Freedom", Computer Graphics, vol. 15, No. 3; Aug. 1981; pp. 91-97.
U.S. Appl. No. 11/411,351.

* cited by examiner

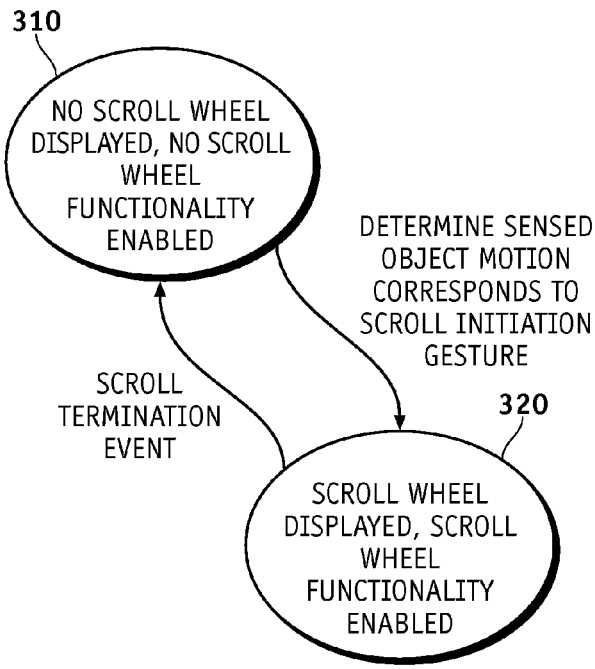
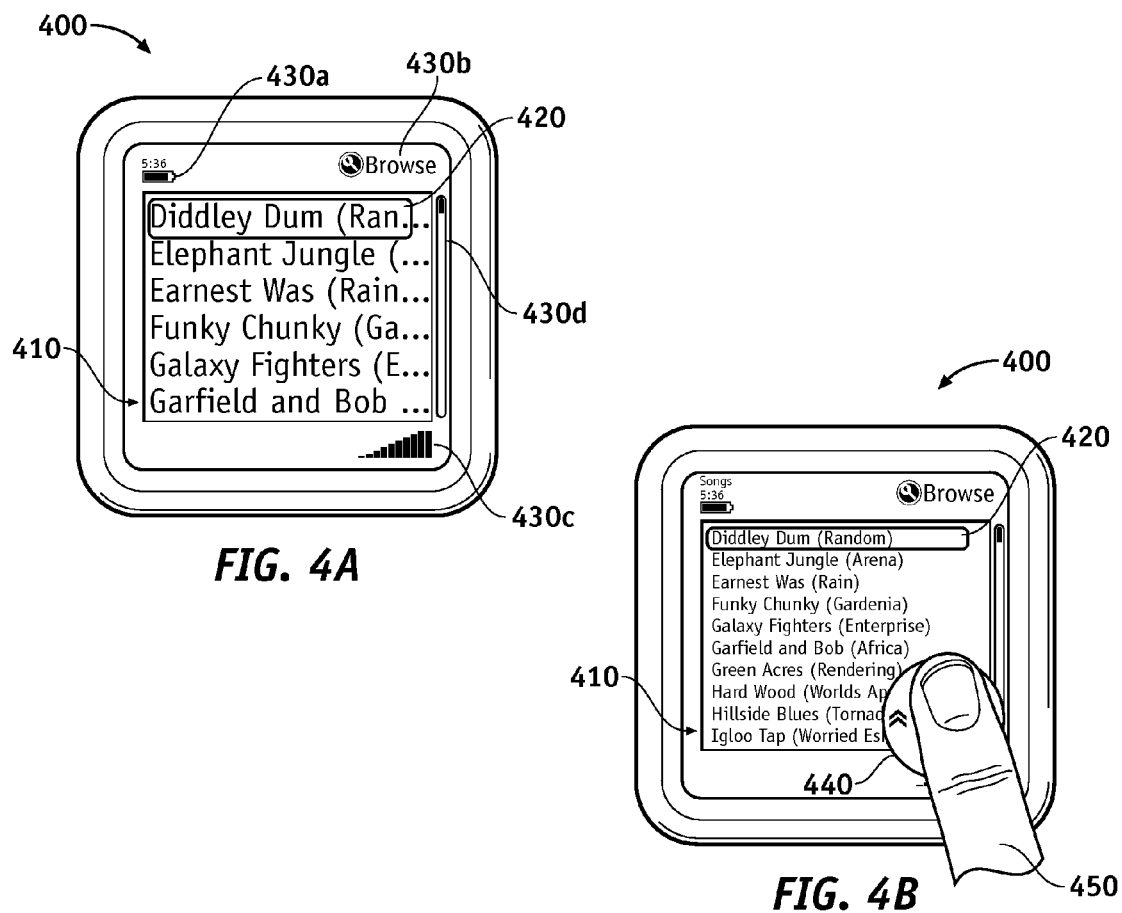

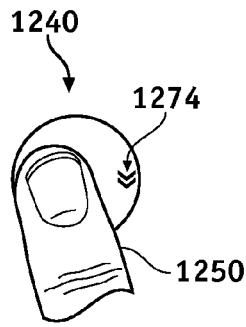
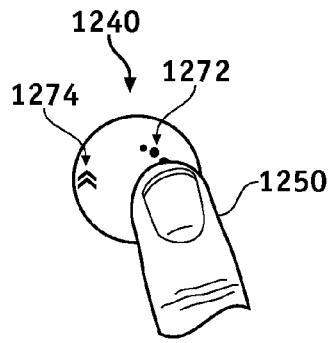
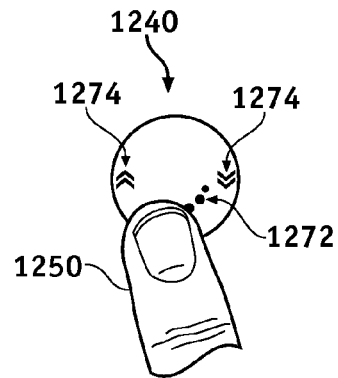
FIG. 12A          FIG. 12B          FIG. 12C
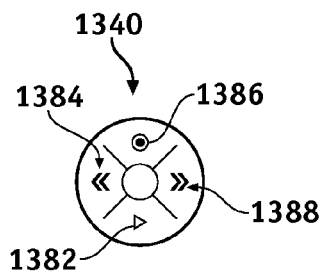
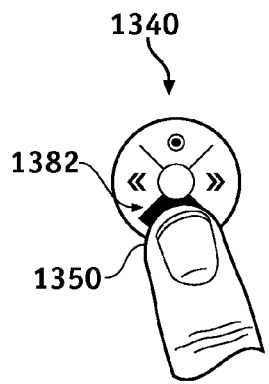
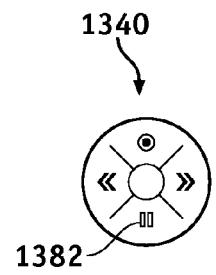
FIG. 13A          FIG. 13B          FIG. 13C
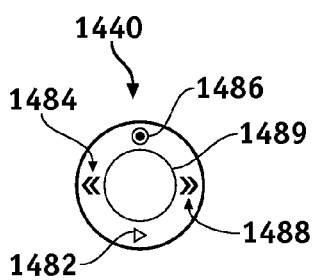
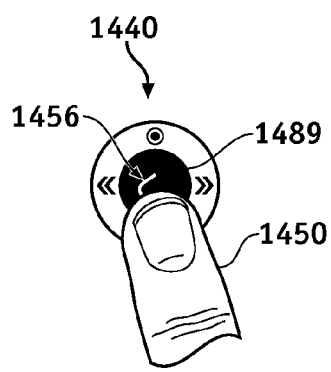
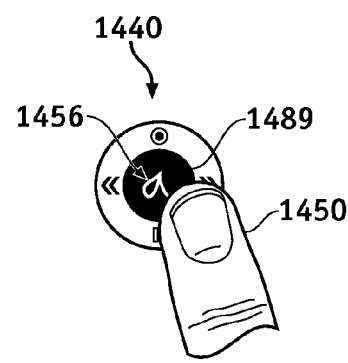
FIG. 14A          FIG. 14B          FIG. 14C

GRAPHICAL SCROLL WHEEL

PRIORITY DATA

This application claims priority to U.S. Provisional Patent Application Ser. No. 60/789,685, filed on Apr. 5, 2006, which is incorporated herein by reference.

FIELD OF THE INVENTION

This invention generally relates to user interfaces involving touch sensor devices.

BACKGROUND OF THE INVENTION

Touch sensor devices (also commonly called proximity sensors, touch screens, tablets, or touch pads) are widely used in a variety of electronic systems. A touch sensor device is a device that typically includes a sensing region that uses capacitive, resistive, inductive, optical, acoustic, or other technology to determine the presence, proximity, location and/or motion of one or more fingers, styli, and/or other objects. The touch sensor device, operated with one or more fingers and/or other objects, can be used to provide an input to the electronic system. For example, touch sensor devices are used as input devices for larger computing systems, such as desktop and notebook computers, as well as kiosks and other terminals. Touch sensor devices are also used in smaller devices, including handheld systems such as personal digital assistants (PDAs) and communication systems such as wireless telephones and text messaging devices. Increasingly, touch sensor devices are used in multimedia systems or their remote controls, such as CD, DVD, MP3 or other media recorders or players.

Examples of capacitive touch sensor devices are described in U.S. Pat. No. 5,880,411, entitled "Object Position Detector with Edge Motion Feature and Gesture Recognition," and U.S. Publication No. U.S. 2004/0252109 A1, entitled "Closed-loop sensor on a solid-state object position detector," which are hereby incorporated by reference. Examples of inductive touch sensor devices include what is described in U.S. Pat. No. 6,249,234, entitled "Position detector," which is also hereby incorporated by reference.

Many electronic systems include (or interact with other systems that include) a user interface, or UI, and an input device for interacting with the UI (e.g., interface navigation). A typical UI includes a screen for displaying graphical and/or textual elements. The increasing use of this type of UI has led to a rising demand for touch sensor devices as input devices. Specifically, many typical UIs are implemented under the assumption that the user has the ability to easily perform several important types of inputs. In these applications the touch sensor device can function as a cursor control/pointing device, selection device, scrolling device, graphics/character/handwriting input device, menu navigation device, gaming input device, button input device, keyboard and/or other input device.

In general, scrolling allows users to navigate through relatively large sets of data. For example, scrolling allows a user to move through an array of data to select a particular entry. As another example, scrolling allows a user to bring particular sections of a large document into view on a display screen that is too small to view the entire document at once. In a system with a traditional graphical UI, programs for navigating documents typically include one or more scrollbars to facilitate scrolling through the document. Scrollbars are relatively effective when used with traditional input devices, such a computer mouse or trackball. However, using them with different input devices, particularly touch sensor devices, can require a significant level of attention and dexterity. In addition, scrollbars can be accidentally actuated and take up space on the graphical UI that can otherwise be used for displaying other images, information, or controls.

Various attempts have been made to facilitate scrolling functions using a touch sensor device. One technique, for example, creates a "jog dial" at a set location on a pen-actuated area of a touch screen. In these systems, pen motion around the center of the jog dial is used to cause scrolling at a rate proportional to the rate of angle subtended by the pen as it moves around the center of the dial. Jog dial scrolling can offer significant usability improvement. However, the set location of the jog dial can make input awkward, and the idea of scrolling at a rate proportional to the rate of angle subtended is conceptually difficult, and training naïve users in its use is non-trivial. In addition, the jog dial can be accidentally actuated and takes up space on the graphical UI that can otherwise be used for displaying other images, information, or controls.

Another attempt to facilitate scrolling functions using a touch sensor device is the traditional capacitive scroll wheel found in commercially available media players such as the second generation APPLE IPOD® sold in 2002. In such a system with a traditional scroll wheel, the touch sensor device is configured to allow users to scroll in one continuous motion as opposed to multiple, distinct strokes. This scrolling capability is useful for small, portable devices like cell phones and MP3 players where real estate available for displaying a large amount of information is more limited and thus effective scrolling through the information more desirable, and for accommodating multiple input devices such as volume controls, four-way joysticks, and jog dials can be difficult. However, the traditional capacitive scroll wheel can be accidentally actuated and takes up significant surface area on the electronic system that can otherwise be allotted to other elements, displays, or controls.

Thus, while many different techniques have been used to facilitate scrolling, there remains a continuing need for improvements in device usability. Particularly, there is a continuing need for improved techniques for facilitating scrolling with touch sensor devices.

BRIEF SUMMARY OF THE INVENTION

The present invention provides a touch screen interface and method that facilitates improved system usability. Specifically, the touch screen interface and method enable a user to easily cause scrolling on a display screen using a touch sensor device.

To facilitate scrolling, the embodiments of the present invention provide a display screen, a touch sensor device, and a processor coupled to the display screen and the touch sensor. The touch sensor device is adapted to sense object motion in a sensing region that overlaps at least part of the display screen. The processor is adapted to cause a scroll wheel that indicates a scrolling path to appear on the display screen selectively, such as in response to the touch sensor sensing object motion that corresponds to a scrolling initiation gesture. The processor is further adapted to cause scrolling on a display screen selectively, such as in response to the touch sensor sensing subsequent object motion along the scrolling path after the touch sensor has sensed the object motion corresponding to the scrolling initiation gesture. The present invention thus allows the display screen to provide a more versatile graphical user interface (GUI), a benefit resulting from having available additional space when the scroll wheel is not shown. The present invention also enables the electronic system to allow the user to scroll in an intuitive manner even as it reduces the chances of accidental scrolling.

BRIEF DESCRIPTION OF DRAWINGS

The preferred exemplary embodiment of the present invention will hereinafter be described in conjunction with the appended drawings, where like designations denote like elements, and:

FIG. 3 is a state diagram of an exemplary touch screen process in accordance with an embodiment of the invention;

FIGS. 4A-B are schematics view of an exemplary touch screen interface in accordance with an embodiment of the invention, where the touch screen interface in FIG. 4A is not showing a scroll wheel and the touch screen interface in FIG. 4B is showing a scroll wheel;

FIGS. 12A-12C are schematic views of a scroll wheel on an exemplary touch screen interface in accordance with an embodiment of the invention at different points in time, where the touch screen interface receives subsequent object motion and providing indications proximate to the scroll wheel;

FIGS. 13A-13C are schematic views of an exemplary touch screen interface in accordance with an embodiment of the invention, where the touch screen interface provides navigation control regions proximate to the scroll wheel;

FIGS. 14A-14C are schematic views of an exemplary touch screen interface in accordance with an embodiment of the invention, where the touch screen interface provides a text-entry area demarked by the scroll wheel;

DETAILED DESCRIPTION OF THE INVENTION

Figure 1:
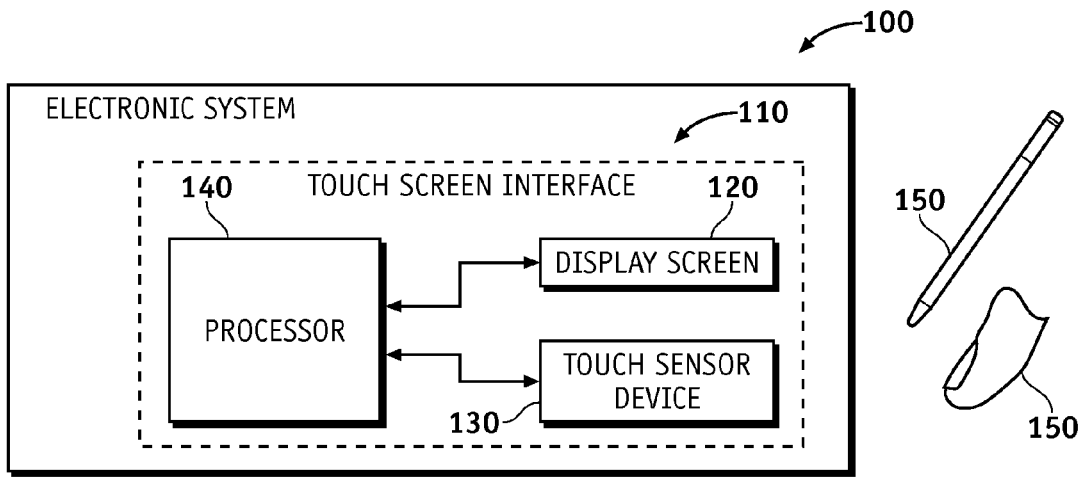
FIG. 1 is a block diagram of an exemplary electronic system that includes a touch screen interface in accordance with an embodiment of the invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides a touch screen interface and method that facilitates improved system usability. Specifically, the touch screen interface and method enable a user to easily cause scrolling on a display screen using a touch sensor device.

In general, a touch screen interface combines a touch sensor device with a display screen. Typically, with most sensing technologies (e.g. capacitive, resistive, and inductive), the touch sensor is stacked with the display screen and sensor elements (e.g. electrodes) are located above, below, or within the display screen elements. Other technologies (e.g. surface acoustic wave and optical) may position the sensor elements elsewhere, but at least part of the sensing region overlaps with the display screen. The resulting combination is usually referred to together as a "touch screen." A touch screen can provide a multi-purpose interface that can function both as a display and as an input device. Furthermore, because virtual touch screen controls can replace some physical input controls, the touch screen can extend to areas of a device typically reserved for other input devices.

In accordance with the embodiments of the invention, a touch screen interface is used to provide scrolling in response to a scroll initiation gesture and subsequent object motion along a path indicated by a graphical scroll wheel (also "scroll wheel"). This may be implemented such that the touch screen interface provides scrolling and visual feedback in response to substantially circular scrolling motions on the touch screen interface. These various embodiments of the invention can provide solutions to common user interface problems associated with traditional scrolling methods. For example, users are not confined to specific scrolling tracks at set locations, and no longer need to follow the exact paths of physical separate scroll wheels. Additionally, less space is required since there are no separate input devices devoted to scrolling; thus, more space can be devoted to the touch screen interface and non-scrolling functions. Furthermore, the touch screen interface enabled with a graphical scroll wheel can provide more visual feedback than one not enabled with a graphical scroll wheel.

As will be discussed further below, there are many different embodiments possible for implementing the graphical scroll wheel. The graphical scroll wheel can be combined with other input controls, regardless of if these input controls are implemented with the touch screen or not. Examples of input controls include touch-sensitive navigation controls, text-sensitive navigation controls, touch screen solutions, and configurable buttons. The graphical scroll wheel can also be implemented with a variety of technologies; for example, capacitive solutions may be desirable as they are typically more durable and rugged than mechanical solutions, and resistive solutions may be desirable as they are less expensive. In addition, the graphical scroll wheel does not need to be perfectly round, and could adopt a variety of shapes; for example, the graphical scroll wheel could be elliptical instead of circular in shape to accommodate screens with different aspect ratios. Also, even though the description below primarily refers to vertical scrolling, the graphical scroll wheel can cause horizontal scrolling actions as well.

The graphical scroll wheel can provide many advantages, such as improved durability and ruggedness, thinner implementations, greater ease-of-use, enabling context-sensitive buttons, faster scrolling and navigation, improved visual feedback, easier utilization by applications, and improved aesthetics that lead to greater "wow" factor in the product.

Turning now to the figures, FIG. 1 is a block diagram of an exemplary electronic system 100 that is coupled to a touch screen interface 110. Touch screen interface 110 can be implemented as part of electronic system 100, or coupled to electronic system 100 using any suitable technique. For example, touch screen interface 110 can be communicably coupled to electronic system 100 through any type of channel or connection, including serial, parallel, I2C, SPI, PS/2, Universal Serial Bus (USB), Bluetooth, RF, IRDA, or any other type of wired or wireless connection to list several non-limiting examples. Similarly, the various elements of electronic system 100 (e.g. processing components, circuitry, memory, casing materials, physical hardware, etc.) can be implemented as part of an overall system, as part of touch screen interface 110, or as a combination thereof.

The term "electronic system" is used in this application to refer broadly to any type of device that communicates with a "touch screen interface." Electronic system 100 can thus comprise any type of device or devices in which touch screen interface 110 can be implemented in or coupled to. As non-limiting examples, electronic system 100 can comprise any type of personal computer, portable computer, workstation, personal digital assistant, video game player, communication device, media device, an input device, or a combination thereof. These examples are meant to be representative and broadly construed. For example, communications devices include wired phones, wireless phones, and electronic messaging devices; input devices include touch sensors such as touch screens and touch pads, keypads, joysticks and mice, and remote controls; media devices recorders and players include televisions, music recorders and players, and set-top boxes such as cable descramblers and video recorders or players; and combination devices include cell phones with built-in cameras, PDAs that can double as electronic messaging systems or cell phones, and the like. In some embodiments, electronic system 100 is itself a peripheral to a larger system, and communicates with another device (in addition to the touch screen interface 110) using a suitable wired or wireless technique. Examples of peripherals include a remote control for a television, set-top box, or music system, a terminal on a wired network, and a media device capable of downloading media wireless from a separate source. Accordingly, the various embodiments of electronic system 100 may include any type of processor, memory, display, or other component as appropriate, and the elements of system 100 may communicate via a bus, network, or other wired or wireless interconnection as applicable. Additionally, electronic system 100 can be a host or a slave to touch screen interface 110. The interactions involving one or more users and electronic system 100 can also take place on additional non-touch screen devices such as a mouse cursor and a traditional computer monitor.

To facilitate scrolling, touch screen interface 110 includes a display screen 120 and a touch sensor device 130, both of which are communicably coupled to processor 140. Display screen 120 is any type of electronic display capable of displaying a visual interface to a human user, and can include any type of LED, CRT, LCD, plasma, or other display technology. Touch sensor device 130 is sensitive to some aspect of object motion of one or more input objects 150 such as fingers and styli in its sensing region. For ease of explanation, single fingers are usually used in the explanations and exemplary embodiments described in this document, even though input from alternatives such as individual ones, averaged versions, or combinations of one or more input objects 150 can be sensed to interact with the scroll wheel function.

It should be noted that the terms "object motion," and "positional information" as used synonymously herein, and are intended to broadly encompass absolute position information, relative position information (reflecting changes in position), and also other types of spatial-domain information such as velocity, speed, and the like, including measurement of motion in one or more directions. The resolution of the positional information can comprise a single bit (e.g. ON/OFF) or multiple bits, as appropriate for the application at hand. Various forms of object motion and positional information may also include time history components, as in the case of gesture recognition and the like. Accordingly, touch sensor devices can appropriately detect more than the mere presence or absence of an object and may encompass a broad range of equivalents.

It should also be noted that although the various embodiments described herein refer to "touch sensor devices," "proximity sensors," or "touch pads," these terms as used herein are used synonymously herein, and intended to encompass not only conventional touch sensor devices, but also a broad range of equivalent devices that are capable of detecting positional information about one or more fingers, pointers, styli and/or other objects. Such devices may include, without limitation, touch pads, touch tablets, biometric authentication devices, handwriting or character recognition devices, and the like. Thus, the interactions between one or more users and touch screen interface 110 could include a touch screen interface 110 with a touch sensor device 130 and one or more fingers, styli, other input objects, or a combination thereof.

Similarly, "sensing region" as used herein is intended to broadly encompass any space where touch sensor device 130 is able, if in operation, to detect the input object(s). In a conventional embodiment, the sensing region extends from the surface of display screen 120 in one or more directions for a distance into space until signal-to-noise ratios prevent object detection. This distance may be on the order of less than a millimeter, millimeters, centimeters, or more, and may vary significantly with factors such as the type of sensing technology used, design of touch sensor interface, characteristics of the object(s) sensed, the operating conditions, and the accuracy desired. For example, embodiments with resistive technology would usually include sensing regions encompassing the thickness of the sensor electrode stack-up, as physical contact of the electrodes is usually required for proper sensing. As another example, embodiments with capacitive technology would usually include sensing regions extending from the display screen 120 to some distance from the display screen. As a third example, embodiments using inductive technology would usually include sensing regions extending further into space than capacitive and resistive embodiments. Accordingly, the size, shape, and exact locations of the particular sensing region of touch sensor 130 would likely vary widely from embodiment to embodiment.

Touch sensor device 130 can use a variety of techniques for detecting an input object. As several non-limiting examples, touch sensor device 130 can use capacitive, resistive, inductive, surface acoustic wave, or optical techniques. In a common capacitive implementation of a touch sensor device 130, a voltage is typically applied to create an electric field across a sensing surface. A capacitive version of touch sensor device 130 would then detect the position of an object by detecting changes in capacitance caused by the changes in the electric field due to the object. Likewise, in a common resistive implementation of touch sensor device 130, a flexible top layer and a bottom layer are separated by insulating elements, and a voltage gradient is created across the layers. Pressing the flexible top layer creates electrical contact between the top layer and bottom layer. The resistive version of touch sensor device 130 would then detect the position of the object by detecting the voltage output due to the relative resistances between driving electrodes at the point of contact caused by the object. In an inductive implementation of touch sensor device 130, electrodes pick up loop currents induced by a resonating coil or pair of coils, and use some combination of the magnitude, phase, and/or frequency to determine distance, orientation or position. In all of these cases, touch sensor device 130 detects the presence of an object and delivers positional information to processor 140. Examples of the type of technologies that can be used to implement the various embodiments of the invention can be found in U.S. Pat. Nos. 5,543,591, 6,249,234 and 5,815,091, each assigned to Synaptics Incorporated.

Touch sensor device 130 is not limited to a single technology, and can utilize any combination of sensing technology to implement one or more sensing regions. For example, touch sensor device 130 can use arrays of capacitive sensor electrodes to support any number of sensing regions. This can be achieved by providing, for each sensing region, an appropriate number of conductive sensor electrode(s) adapted to sense capacitively and connecting them to an appropriate number of conductive routing traces. In most cases, a plurality of capacitive sensor electrodes would be coupled to a plurality of routing traces that are equal to, or fewer in number than, the sensor electrodes. In operation, the plurality of conductive traces are coupled to processor 140, and processor 140 is adapted to control touch sensor device 130 by driving the plurality of conductive sensor electrodes electrically using the plurality of conductive routing traces. Further examples of providing arrays of capacitive sensor electrodes and connecting them to conductive routing traces and processors, and adapting processors to control touch sensor devices can be found in U.S. Pat. No. 5,880,411, entitled "Object Position Detector with Edge Motion Feature and Gesture Recognition", and U.S. Publication No. US 2004/0252109 A1, entitled "Closed-loop sensor on a solid-state object position detector," which are hereby incorporated by reference. As another example, touch sensor device 130 can use capacitive sensing technology in combination with resistive sensing technology to support the same sensing region or different sensing regions.

Thus, depending on factors such as the sensing technique used for detecting object motion, the size and shape of the sensing region, the desired performance, the expected operating conditions, and the like, touch sensor device 130 and processor 140 can be implemented with a variety of different ways. The sensing technology can also vary in the type of information provided, such as to provide "zero-dimensional" positional information as a binary value (e.g. ON/OFF indicating presence or contact), "one-dimensional" positional information as a scalar (e.g. location, velocity, or speed along a centerline of a sensing region), "two-dimensional" positional information (e.g. location, velocity, or speed indicated with information measured about horizontal and vertical axes, angular and radial axes, or any other combination of axes that span two dimensions), and even higher-dimensional values along more axes (e.g. force) given appropriate sensor design. The type of information provided can also be results derived from the N-dimensional positional data, such as a combination of meaningful values indicative of the N-dimensional positional data, and the like.

In touch screen interface 110 of electronic system 100, processor 140 is coupled to touch sensor device 130 and display screen 120. Generally, processor 140 receives electrical signals from touch sensor device 130, processes the electrical signals, and communicates with display screen 120. Processor 140 would also typically communicate with electronic system 100, providing indications of input received on touch sensor device 130 and perhaps receiving information or instructions in turn.

The term "processor" is used herein to include the processing elements that are adapted to perform the recited operations, regardless of the number of physical elements. Thus, processor 140 can comprise all or part of one or more discrete components, integrated circuits, firmware code, and/or software code that receive electrical signals from touch sensor device 130 and cause the appropriate response on display screen 120. Processor 140 can be physically separate from touch sensor device 130 and display screen 120, as well as any part of electronic system 100; alternatively, processor 140 can be implemented integrally with any of these parts. In some embodiments, the elements that comprise processor 140 would be located with or near touch sensor device 130 and display screen 120. In other embodiments, some elements of processor 140 would be with touch screen interface 110 and other elements of processor 140 would reside elsewhere, such as on or near a distant electronic system 100. For example, processor 140 can reside at least partially on a processing system performing other functions for electronic system 100.

Processor 140 can receive electrical signals from touch sensor device 130 in a variety of ways. For example, processor 140 can selectively drive and read individual sensor electrodes of touch sensor device 130 in sequence, subsets of the sensor electrodes with each other, or all of the sensor electrodes simultaneously, and can change the sensor electrodes driven in a predefined or dynamically determined manner. Processor 140 can also perform a variety of processes on the electrical signals received from touch sensor device 130 to implement touch screen interface 110. For example, processor 140 can detect object motion by deriving absolute position, relative motion, velocity, speed, or any other form of positional information appropriate using the signals from the sensor electrode(s). Processor 140 can indicate an appropriate response to the positional information to electronic system 100 or render an appropriate response on display screen 120 directly, depending on how the system is set up. Processor 140 can also generate and provide signals in response to instantaneous or historical information about object motion as appropriate for the application at hand. In addition, processor 140 can report information to electronic system 100 continuously, when a threshold on one or more positional information attributes is passed, or when an identifiable input sequence (e.g. a tap, stroke, character shape, gesture, etc.) has occurred on touch sensor device 130; similarly, processor 140 can cause display screen 120 to show various visual elements in response to such information.

Processor 140 can also determine when certain types or combinations of object motion occur proximate to touch sensor device 130. For example, processor 140 can distinguish between object motion of a first object combination (e.g., one finger, a relatively small object, etc.) and object motion of a second object combination (e.g., two adjacent fingers, a relatively large object, etc.) proximate a sensing region of touch sensor device 130, and can cause appropriate results in response to that object motion. Additionally, processor 140 can distinguish the temporal relationship between object motion of different object combinations. For example, processor 140 can determine when object motion of the first object combination has followed object motion of the second object combination, and provide a different result responsive to the object motions and their temporal relationship.

In operation, at least part of the sensing region of touch sensor device 130 overlaps a portion of or the entire display screen 120, such that touch screen operation is enabled. For example, the touch screen interface 100 can be adapted such that user input can involve direct mapping of user input on the touch screen interface 100 to positions of a displayed user interface underneath the user input. With touch screen operation enabled, a user can interact with a part of touch screen interface 110 where touch sensor device 130 overlaps display screen 120, and cause a response on touch screen interface 110, electronic system 100, or both. Typically, touch screen operation allows one or more users to interact with different portions of the touch screen interface 100 where touch sensor device 130 overlaps display screen 120, and causes different responses on touch screen interface 110 depending on which type of interaction and which portion of touch screen interface 110 involved. Typically, as user(s) provide input to touch screen interface 110, touch sensor device 130 suitably detects positional information regarding input object(s) in one or more sensing regions and provides this positional information to processor 140. Processor 140 appropriately processes the positional information to accept inputs from the user. In response to the input, processor 140 may cause a response on display screen 120, such as by moving one or more cursors, highlighters, or other items shown on display screen 120, by scrolling through one or more lists or other images shown on display screen 120, by changing one or more characteristics of items shown on display screen 120, and by any other appropriate method.

To facilitate scrolling, processor 140 is adapted to cause a graphical scroll wheel that indicates a scrolling path to appear on display screen 120 selectively, such as in response to touch sensor device 130 sensing object motion that corresponds to a scrolling initiation gesture. Processor 140 is further adapted to cause scrolling on a display screen 120 selectively, such as in response to touch sensor device 130 sensing subsequent object motion along the scrolling path after touch sensor device 130 has sensed the object motion corresponding to the scrolling initiation gesture. Touch screen interface 110 thus allows display screen 120 to provide a more versatile graphical user interface (GUI), a benefit from having available additional space when the graphical scroll wheel is not shown. Touch screen interface 110 also enables electronic system 100 to allow the user to scroll in an intuitive manner, even as it reduces the chances of accidental scrolling.

Many different embodiments exist that fall within the implementation contemplated for electronic system 100 and touch screen interface 110. Processor 140 can be adapted to recognize (i.e. identify) one or more specific types of object motion as corresponding to gesture(s) for scrolling initiation. In one example, object motion substantially following at least a portion of a substantially circular path corresponds to the scrolling initiation gesture. In another example, object motion approaching display screen 120 and then holding relatively still for a designated amount of time comprises the object motion corresponding to a scrolling initiation gesture.

In a further example, the object motion corresponding to a scrolling initiation gesture is required to be that of a single object. In addition, processor 140 can be further adapted to require that the same single object provide the object motion corresponding to the subsequent object motion along the scrolling path.

Processor 140 can also be adapted to cause scrolling in particular ways. In one example, the processor is adapted to identify a direction of the subsequent object motion and to cause scrolling in a way corresponding to the direction of the subsequent object motion. For example, a clockwise direction of the subsequent object motion can correspond to upwards or rightwards scrolling, and a counter-clockwise direction of the subsequent object motion can correspond to downwards or leftwards scrolling.

Processor 140 can also be adapted to cause the graphical scroll wheel to appear in a certain way. In one example, processor 140 is adapted such that the scroll wheel appears underneath the object(s) associated with the scrolling initiation gesture. In another example, processor 140 is adapted to change a characteristic of the graphical scroll wheel in response to a change in a speed of the subsequent object motion along the scrolling path. Among various choices, the characteristic that is changed can be the size of the scroll wheel, the transparency of the scroll wheel, or a combination thereof. In a further example, processor 140 is adapted to cause the graphical scroll wheel to disappear, such as in response to a scroll wheel disappearance event. The scroll function can continue or terminate after the graphical scroll wheel disappears. This disappearance-with-continued-scroll-function can be implemented in a multitude of ways. As some examples, processor 140 can be adapted to cause the graphical scroll wheel to disappear after a period of time has passed, after the touch sensor 130 has sensed particular gesture(s) and/or input(s) in particular region(s) (as long as they do not correspond to a scrolling termination event), after electronic device 100 has received specific user input (e.g. via a particular input device such as a microphone, knob, or button, and perhaps meeting a select criterion such as pitch, duration, or force). Processor 140 can also be adapted to cause the graphical scroll wheel to disappear in response to touch sensor 130 sensing, after sensing the object motion corresponding to the scrolling initiation gesture, a scrolling termination event. Some examples of the scrolling termination event include a passage of a duration of time after an appearance of the graphical scroll wheel, a lack of object motion along the scrolling path for some time, and ceased object presence in the sensing region for some time. In yet another example, processor 140 is adapted to make a portion of a scrollable list of items viewable through the graphical scroll wheel.

Processor 140 can also be adapted to cause display screen 120 to show particular element(s). In one example, processor 140 is adapted to cause an indication to appear on the display screen proximate to the graphical scroll wheel. The indication can provide information about the current position of scrolling or a current direction of scrolling. In another example, processor 140 is adapted to cause display screen 120 to show a list of items, a highlighted item in the list of items, and information about the highlighted item.

The graphical user interface supported by touch screen interface 110 can be further enhanced with additional functionality related to the graphical scroll wheel. In one example, the graphical scroll wheel demarks a text-entry area, touch sensor 130 is adapted to receive character input in the text-entry area, and processor 140 is adapted to perform character recognition on the character input received in the text-entry area. Processor 140 can be further adapted to identify an applicable portion of a scrollable list associated with the character input received in the text-entry area, and to cause display screen 120 to show the applicable portion of the scrollable list. In another example, display screen 120 shows a navigation control region along the graphical scroll wheel, and processor 140 is adapted to perform a navigation task different from scrolling in response to touch sensor 130 sensing user input in the navigation control region.

The graphical scroll wheel can also be used with user configurable interfaces, and the processor 140 can also be adapted such that the graphical scroll wheel is user configurable. The user(s) of the touch screen interface 110 can define and change any or all aspects of the scroll wheel function, and this can be accomplished through direct user input, analysis of past user history, or a combination thereof. To note just a few examples, processor 140 may be adapted such that users can set and change one or more of the following: characteristics of scroll initiation gesture(s); scroll wheel size, transparency, or visual appearance; characteristics of scrolling termination gesture(s), scroll amount, speed, or ballistics; durations associated with the appearance and disappearance of the scroll wheel; timings associated with scroll wheel response; if precursor images are used and their characteristics if so; if the scroll wheel can disappear while still retaining a scroll function and its characteristics if so; what is scrolled; or any other aspect of the scroll wheel function.)

As discussed earlier, many technologies are available to implement the touch sensor device 130. In one likely embodiment, touch sensor 130 is stacked with display screen 120 and senses capacitively.

Thus, touch screen interface 110 provides a more versatile graphical user interface (GUI) that allows utilization of space that would otherwise be taken up by a permanently provided scrolling element. The touch screen interface 110 also enables the user to scroll in an intuitive manner without requiring the user to perform a more complex gesture on the proximity sensor device, such as repeatedly lifting and retouching a finger to the sensing region.

Figure 2:
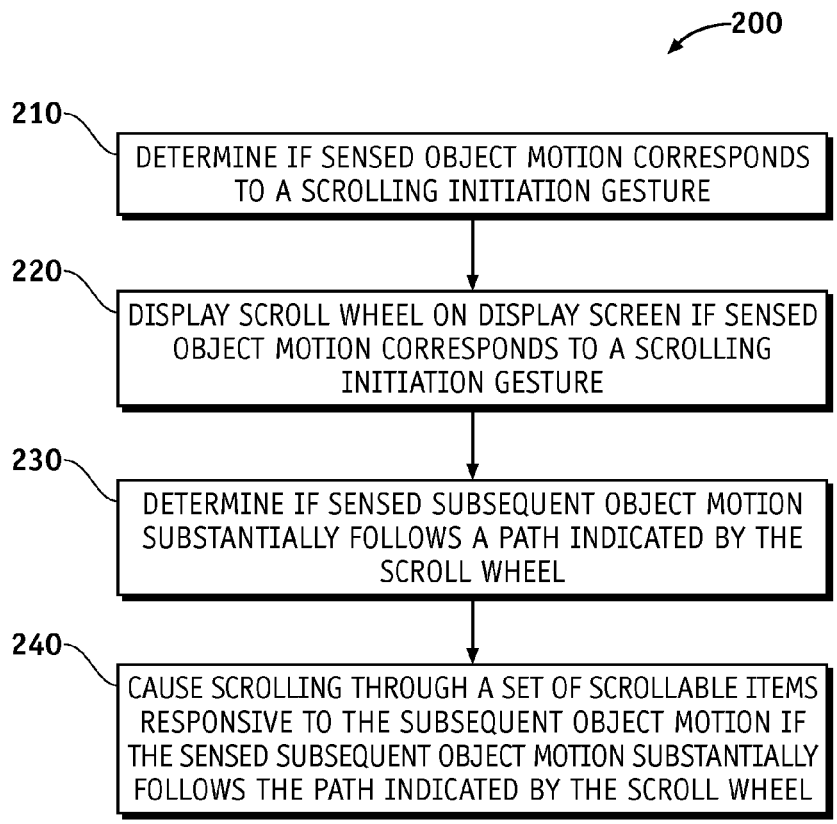
FIG. 2 is a flow chart of an exemplary touch screen process in accordance with an embodiment of the invention.

Turning now to FIG. 2, a flow chart of a touch screen process 200 is shown. Touch screen process 200 can be used with the electronic system 100 shown in FIG. 1 or any electronic systems or touch screen interfaces described herein. Touch screen process 200 contains method steps appropriate for implementing the scroll wheel function and enabling scrolling.

In step 210, it is determined if sensed object motion corresponds to a scrolling initiation gesture. In one example, the processor 140 determines if the sensed object motion corresponds to a scrolling initiation gesture. The sensed object motion is object motion detected by the applicable touch sensor device of the touch screen interface (e.g. touch sensor device 130 of touch screen interface 110) during operation, which means that the sensed object motion takes place proximate to the touch sensor device. As described earlier, the sensed object motion can comprise any type of positional information of any number and type(s) of objects, and be sensed using any technology appropriate for the touch sensor device.

In a typical case, the touch sensor device (e.g. touch sensor device 130) uses capacitive, inductive, or resistive technology to sense object motion of a single finger, stylus, or another input object, and provides electric signals to the processor (e.g. processor 140). The processor then examines the electric signals from touch sensor device to compute absolute position or relative motion about the input object. As one example, sensing object motion proximate to the touch screen comprises sensing the position of an object over time and then calculating how the object has moved from the data gathered on object positions over some amount of time. Further examples of capacitive sensors and processors detecting and processing object motion can be found in U.S. Pat. No. 5,880,411, entitled "Object Position Detector with Edge Motion Feature and Gesture Recognition", and U.S. Publication No. US2004/0252109A1, entitled "Closed-loop sensor on a solid-state object position detector," which are hereby incorporated by reference. The relevant display screen (e.g. display screen 120) oftentimes would already be displaying part or all of a set of scrollable items on the touch screen when the object motion is sensed, or the display screen may change to show part or all of a set of scrollable items in response to the sensed object motion or some other event.

Moving onto step 220, a graphical scroll wheel appears on display screen if the sensed object motion corresponds to the scrolling initiation in response to determining that the sensed object motion corresponds to a scrolling initiation gesture. In one example, processor 140 causes a graphical scroll wheel to appear on display screen 120 in response to the determination. The graphical scroll wheel need not appear simultaneously with the determination, or appear at an exact time after the determination. However, in a typical case the graphical scroll wheel would appear reasonably soon, or even as soon as possible, after the determination; this is to indicate, in a timely manner, a path for subsequent object motion that would result in scrolling and that the touch screen interface is ready to perform scroll wheel functions.

In step 230, it is determined if sensed subsequent object motion substantially follows a path indicated by the graphical scroll wheel. In one example, processor 140 determines if the sensed subsequent object motion substantially follows the path. Sensed subsequent object motion comprises sensed object motion occurring after a sensed scroll initiation gesture; in other words, sensed subsequent object motion occurs after the sensed object motion corresponding to the scroll initiation gesture. Depending on when the graphical scroll wheel appears in response to the determination of the scrolling initiation gesture, subsequent object motion can occur before, during, or after the appearance of the graphical scroll wheel.

Some embodiments of the touch screen interface may impose a time-out starting at the end of the object motion corresponding to the scrolling initiation gesture, during which sensed object motion would not be considered subsequent object motion. Other embodiments may be adapted to reject object motion taking place after the object motion corresponding to the scrolling initiation gesture and before the appearance of part or all of the graphical scroll wheel. Any of these may be done for purposes such as reducing processing load, better usability, and improved noise rejection.

In many cases, users may prefer to be able to input subsequent scrolling gestures even before the system has determined that earlier sensed object motion corresponds to a scroll initiation gesture. To enable this, embodiments can store sensed object motion and then retroactively examine the stored history to ascertain if subsequent object motion had occurred during an appropriate time span. For example, an appropriate time span can be after the sensed object motion that corresponded to scroll initiation has occurred, and before the determination that the sensed object motion corresponded to scroll initiation has occurred.

Moving onto step 240, scrolling occurs. In one example, processor 140 determines that the subsequent object motion substantially follows the scrolling path indicated by the graphical scroll wheel, and causes scrolling in response. In most cases, this scrolling results in changing what is shown on a visual display (e.g. on display screen 120). In general, scrolling allows users to navigate through larger sets of data, especially through visual data that is more than can be shown at once on a display screen or on a defined portion of the display screen (e.g. a "window" of a GUI). Scrolling can allow a user to navigate through an array of data to select a particular entry, such as by moving an indicator within a list, menu, or other set of data. This type of scrolling would appear to users as if they were moving highlighters, selection points, or other indicators through whatever portions sets of scrollable items are displayed. Scrolling can also allow a user to bring particular sections of a large document into view on a smaller display screen or window. This type of scrolling would appear to users as if they were moving the viewing region, such as moving a window to bring different portions of a document into view. The scrolling result need not appear simultaneously with the determination, or appear at an exact time after the determination. However, in typical cases, scrolling would occur reasonably soon after determination, even as soon as possible, to provide proper feedback to user (s).

Many different embodiments fall within the implementation contemplated for touch screen process 200. For example, causing the set of scrollable items to scroll can involve the steps of determining a direction of the subsequent object motion and causing scrolling in a way corresponding to the direction of the subsequent object motion. Determining a direction can involve ascertaining if the motion is clockwise or counterclockwise, up or down, left or right, or any other combination that fits the scrolling function enabled by the graphical scroll wheel (e.g. "similar or not similar to previous direction along the path indicated by the graphical scroll wheel" coupled with "clearly along," "slightly deviating," or "clearly deviating from the path"). In many cases, a clockwise direction of the subsequent object motion corresponds to scrolling in an upwards (or rightwards) way while a counter-clockwise direction corresponds to scrolling in a downwards (or leftwards) way, or vice versa.

As another example, touch screen process 200 can also include causing the graphical scroll wheel to disappear in response to a scroll wheel disappearance event, with or without ending the scroll function. In one example, processor 140 causes the graphical scroll wheel to disappear, with or without ending the scroll function.

Taking the case where the scroll function does not end with the disappearance of the graphical scroll wheel, subsequent object motion substantially along the path previously indicated by the graphical scroll wheel when it was displayed would still result in scrolling, even though the graphical scroll wheel was no longer displayed. This disappearance of the graphical scroll wheel removing the visual obstruction that the graphical scroll wheel imposes, and can provide a better view to the user of the display. For example, the graphical scroll wheel disappearance may aid in making the display of the items that are being scrolled through to the user.

The graphical scroll wheel can disappear in response to a variety of events, including in response to signals received outside of the touch screen interface (e.g. from electronic system 100 outside of touch screen interface 110). These signals can be generated in response to user input (e.g. user manipulation of a control of electronic system 100, particular user gestures on touch sensor device 130), lack of user input (e.g. particular user input not occurring within an expected time, or no user input at all for some time), signals from components of touch screen interface (e.g. display screen 120 of touch screen interface 110 powering down to save energy, timers or counters in processor 140, etc.), or signals from applications running on the electronic system (e.g. signals generated by applications running on electronic system 100 in response to a selection of a function or process or application where scrolling is not appropriate). The graphical scroll wheel can also disappear after the graphical scroll wheel has been displayed for a period of time. A ready way to implement this time-out would be to use a trigger internal to processor 140, such as those provided by timers or counters. This length of time can be measured from the sensing of the beginning or end of the object motion that corresponds to a gesture for initiating scrolling. In this case, the touch screen interface would usually store some history of the object motion, since the history would enable it to ascertain information about the beginning or end of the object motion corresponding to a scroll initiation gesture, after determining it to correspond to the scroll initiation gesture. This length of time can alternatively be measured from when a determination of a scroll initiation gesture has occurred. In addition, this length of time can be measured from when the graphical scroll wheel appeared on the display (e.g. on display screen 120); if the length of time for the graphical scroll wheel to appear is measurable, then the length of time can also be measured from some defined point during the appearance of the graphical scroll wheel.

Further, touch screen process 200 can include identifying a scrolling termination event, typically after sensing the object motion corresponding to the scrolling initiation gesture, and terminating the scroll wheel function in response. With the scroll wheel function terminated, additional object motion substantially along the path indicated by the graphical scroll wheel would no longer result in scrolling. Touch screen process 200 can be adapted such that step 210 occurring again would reestablish the scroll wheel function.

Scrolling termination events are usually scroll wheel disappearance events as well. In other words, if touch screen process 200 includes identifying a scrolling termination event, it would also usually include causing the graphical scroll wheel to disappear if the graphical scroll wheel is displayed at that time. The disappearance of the graphical scroll wheel can occur immediately after, or some time after, identifying the scrolling termination event.

Many scrolling termination events can be used with the touch screen interface. For example, the scrolling termination event can include a passage of a duration of time after an appearance of the graphical scroll wheel, a lack of object motion along the scrolling path for some time, ceased object presence proximate to the scroll wheel for some time, ceased object presence in the sensing region for some time, any combination thereof, or any other appropriate event. The termination event can also be particular user input, lack of user input anywhere to the electronic system, signals from components in the touch screen interface (e.g. component of display screen 120, touch sensor device 130, or some other component of touch screen interface 110), or signals from applications running on electronic system in communication with the touch screen interface. Some gestures that may be used for terminating scrolling involve one or more regions (e.g. subregions of the sensing region of touch sensor device 130) that are defined statically or dynamically to be associated with scrolling termination; interaction with these regions (s) would then cause scrolling termination. It is also possible to define scrolling termination events to involve specific interactions with these region(s), such as tapping quickly (e.g. shorter duration below some threshold), touching for longer durations (e.g. longer duration above some threshold), or a more complex maneuver. For example, if single taps or touches are also used for other touch screen functionality, such as selection, then multiple taps or touches can be used instead to distinguish scrolling termination input. The statically or dynamically defined regions may be indicated to users by appropriate demarcations displayed (e.g. dynamically shown on display screen 120.)

Touch screen process 200 can also include causing an appearance of a precursor image to appear (e.g. to appear on display screen 120). This precursor image would appear after determining the object motion corresponding to the scrolling initiation gesture, and is indicative of an imminent appearance of a full image of the graphical scroll wheel. After the precursor image appears, the full image of the scroll wheel would replace the precursor image. The precursor image can also change such that it appears to move to viewers.

FIG. 3 is a state diagram showing a way to implement touch screen process 200 using states. Touch screen state diagram 300 shows two states appropriate for implementing a method of enabling scrolling.

In state 310, the touch screen interface (e.g. touch screen interface 110) is in a state where display screen (e.g. display screen 120) is not displaying a graphical scroll wheel, and no scroll wheel functionality is enabled. With no scroll wheel functionality enabled, object motion along any path indicated by any previously displayed scroll wheels would not result in scrolling. Determining that sensed object motion corresponds to a scroll initiation gesture brings the touch screen interface to state 320, where a graphical scroll wheel is displayed and scroll wheel functionality is enabled. In state 320, object motion along a path indicated by the graphical scroll wheel displayed (or on the way to be displayed) results in scrolling. As discussed earlier, state transitions may occur almost instantaneously or take some time (e.g. seconds), and may be accompanied by precursor images, timeouts where object motion is ignored, or any other appropriate action or event. In addition, the displaying of the graphical scroll wheel and the enabling the scroll wheel functionality need not occur simultaneously, and one may occur before the other.

In addition to states 310 and 320, additional states and transitions can be incorporated to implement alternatives discussed earlier as available to touch screen process 200. For example, if the touch screen interface is in state 320, identifying a scroll wheel disappearance event that is also a scrolling termination event can bring the touch screen interface back to state 310. The disappearance of the graphical scroll wheel and the termination of the scroll wheel functionality associated with this transition from state 320 to state 310 can occur simultaneously or at separate times, and can be accompanied by any appropriate action or event.

As another example, a third state (not shown) can also exist where display screen is not displaying any graphical scroll wheel(s), but scroll wheel functionality is enabled. The touch screen interface can enter this third state from state 320 in response to a scroll wheel disappearance event other than a scrolling termination event simply by causing the graphical scroll wheel to disappear. This disappearance can be in response to scroll wheel disappearance events such as the mere passage of a period of time, which can be measured from when the graphical scroll wheel is displayed, when scroll wheel functionality is enabled, when state 320 was fully entered, or from any other appropriate starting point. The disappearance can also be in response to any of the events discussed earlier in conjunction with touch screen process 200.

It is also possible to move from this third state to state 320, and this transition can be in response to sensing object motion corresponding to a scroll initiation gesture. For example, processor 140 can cause touch screen interface 110 to transition from the third state to state 320 in response to sensing the proper object motion. In the case where all or a portion of the object motion corresponding to the scroll initiation gesture includes object motion along the path previously indicated by the graphical scroll wheel, the same object motion can cause both scrolling and the redisplay of the graphical scroll wheel. Other options also exist for restoring the display of the graphical scroll wheel, such as user input on the touch screen interface or elsewhere to the electronic system in communication with the touch screen interface, or an internal trigger such as those associated with applications running on the electronic system. It is also possible to transition from the third state to state 310, such as in response the identification of a scrolling termination event.

In addition to the third state example, there are many other alternative states and transition paths not shown in FIG. 3 that can be added to implement the alternatives for touch screen process 200.

It should be noted that although the foregoing descriptions were primarily directed to electronic system 100, touch screen process 200, and state diagram 300, they are generally applicable to embodiments of this invention, including those described in the rest of this document. Similarly, the descriptions associated with specific embodiments described below can also be applicable to other embodiments as appropriate. It should also be noted that although the following descriptions refer primarily to touch screen interfaces instead of their components, the touch screen interfaces do include display screens, touch sensors, and processors as described for touch screen interface 110. Therefore, touch screen interfaces showing images would do so by having their respective display screens show the images, touch screen interfaces sensing objects would do so via their respective touch sensor devices sensing the objects, and touch screen interfaces identifying, determining, or otherwise processing would do so via their respective processors. In addition the following figures show both object motion corresponding to a scrolling initiation gesture and subsequent object motion along the scrolling path as the motion of single objects for ease of explanation (e.g. input objects 450, 750, and 850). However, either or both of the scrolling initiation gesture and the subsequent object motion may include more than one input object and may involve different types of input objects; in addition, the gestures may also involve varying the number, size, relative location, applied force, or any other appropriate characteristic of the input object(s).

FIGS. 4A-4B are schematic views of an exemplary touch screen interface 410 integrated with electronic system 400, where touch screen interface 410 in FIG. 4A is not showing a graphical scroll wheel and touch screen interface 410 in FIG. 4B is showing a graphical scroll wheel. The touch screen interface 410 interaction is implemented to mimic the physical scroll wheel actions and provide a visual indication of scrolling to the user. Touch screen interface 410 is but one example of the many GUIs that can be implemented.

Touch screen interface 410 shows a part of a set of scrollable items, represented by a list of titles of various music pieces. Touch screen interface 410 also displays informational items 430A-D. Informational item 430A includes both graphics and text, and indicates the energy level available to electronic system 400 via a battery icon and a charged amount. Informational item 430A also indicates the time using Arabic numerals near the battery icon. Informational item 430B includes both text and graphics, with an icon and text both indicating that a media application running on electronic system 400 is in a "Browse" menu. Informational item 430C is purely graphical, and shows volume through a series of bars that roughly outlines a larger triangle. Informational item 430D is also purely graphical, and includes a standard scroll bar that provides an indication of the current position of scrolling. As with standard scroll bards, a scroll thumb (the darker portion of the scroll bar) is shown near the top of scroll bar, and indicates which part of the total set of scrollable items is displayed. The relative size and location of the scroll thumb within the scroll bar provide further information about the size of the total set of scrollable items and the what part of the set of scrollable items is displayed. Informational items 430A-430D may also be enabled to provide input functionality. As just a couple of examples, object motion near informational item 430C may affect the volume, and object motion near informational item 430D may cause scrolling or jumping through the set of scrollable items.

FIG. 4B shows touch screen interface 410 after a scrolling initiation gesture has been performed by input object 450 (shown as a finger) and has caused an on-demand graphical scroll wheel 440 to appear. Thus, to users, the perception is that when a user initiates a scrolling motion on touch screen interface 410, a circular graphical scroll wheel 440 appears on the touch screen interface 410. The graphical scroll wheel 440 is a representation of a physical scroll wheel that is circular, and in FIG. 4B appears underneath a touch location when the scroll wheel function is enabled. The location where the graphical scroll wheel 440 appears can be varied. For example, if the scroll initiation gesture involves little movement of the input object or includes a duration where the input object is held relatively still, then the graphical scroll wheel 440 that results may be underneath the touchdown location where the input object 450 was held relatively still. In contrast, if the scroll initiation gesture includes more movement, then the graphical scroll wheel 440 can appear at a touchdown location where input object 450 first contacted the touch screen interface 410 or a liftoff location where the input object 450 ended contact with the touch screen interface 410. Alternatively, the location of scroll wheel appearance can be some type of average position of the object motion corresponding to the scroll initiation gesture, or some other appropriate location. Examples of other appropriate locations for scroll wheel appearance include near selected locations near the top or bottom of the set of scrollable items shown on touch screen interface 410, perhaps based on which location would best avoid interfering with the display of the scrollable set of items or which location would best provide visual feedback of scrolling.

Graphical scroll wheel 440 can also change after appearing. For example, graphical scroll wheel 440 can indicate the direction of scrolling dynamically. As shown in FIG. 4B, graphical scroll wheel 440 includes arrows that indicate the current direction of scrolling as clockwise. As another example, graphical scroll wheel 440 can be implemented such that it moves during scrolling, and appear at the top of the set of scrollable items shown on touch screen interface 410 when the user is scrolling up, and at the bottom when the user is scrolling down. Alternatively, graphical scroll wheel 440 may be implemented to change in response to input object 450 location, such as by tracing the positions of input object 450 within the graphical scroll wheel 440 or moving graphical scroll wheel 440 to be centered underneath the input object 450. When more than one input object is present, the positional information used can be that of a single input object determined to be the scrolling input object, some type of average (e.g. centroid) of a subset of the input objects determined to be the scrolling input objects, or all of the sensable input objects. In the case of where graphical scroll wheel 440 moves, the path indicated by graphical scroll wheel 440 can also move to match the moved display of the graphical scroll wheel 440, or can stay stationary as indicated by the initial display of the graphical scroll wheel 440.

The GUI can also change to facilitate scrolling. For example, when the scroll wheel function is active, the size of scrollable items (e.g. list entries) displayed can also decrease, to facilitate scrolling by allowing more of the scrollable items to be displayed when the scroll wheel function is active. The decreased size of the scrollable items can also indicate that the scroll wheel function is active, which may be especially useful if the graphical scroll wheel later disappears while the scroll wheel function is still active. The decreased size can also be used to indicate which set of items would be scrolled by subsequent object motion along the graphical scroll wheel, if more than one set of items are displayed. For example, touch screen interface 410 has been implemented to thus change the GUI display to accommodate the scroll wheel function. In FIG. 4A, a highlighter 420 encircles the topmost item "Diddley Dum (Ran . . . )." The sizes of the scrollable items displayed are relatively large. In comparison, in FIG. 4B, the size of the list entries have decreased such that more of the list is displayed, the highlighter 420 that encircles the topmost item has become skinnier to match, and the entire title "Diddley Dum (Random)" is shown. This optional enlarging of the displayed items when the scrolling function is not active and shrinking of the of the displayed items when the scroll function is active may be useful in some embodiments, where larger displayed item facilitate selection and smaller displayed item facilitate scanning while scrolling.

Figure 5:
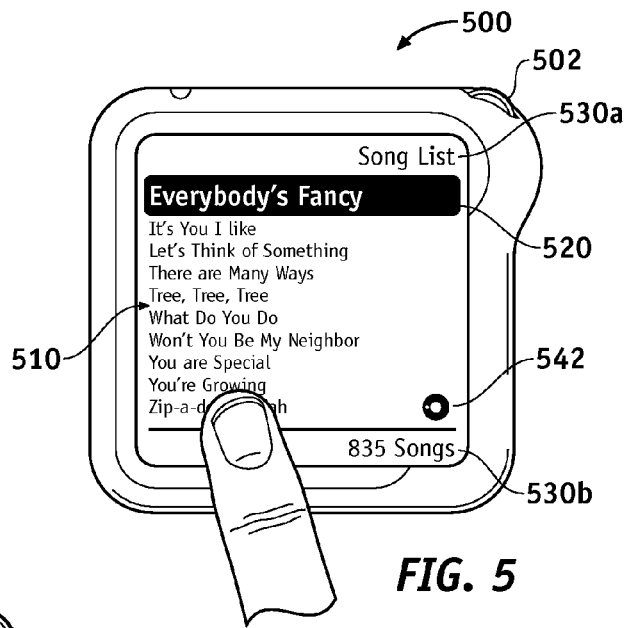
FIG. 5 is a schematics view of an exemplary touch screen interface in accordance with an embodiment of the invention, where a small icon replaces the full scroll wheel.

FIG. 5 is a schematics view of an exemplary touch screen interface 510 of electronic system 500, where a small scroll icon 542 replaces the full graphical scroll wheel (not shown). Although electronic system 500 is also a media device, just as electronic system 400, electronic system 500 differs in that it has a mechanical thumb dial 602, which can be manipulated to scroll or select the set of scrollable items as an alternate way of scrolling. Touch screen interface 510 is quite similar to touch screen interface 410, and supports similar functions as well as has analogous highlighter 520 and informational items 530A-B (in this case, showing textual information about the number of songs in a scrollable set). However, unlike touch screen interface 410, touch screen interface 510 presents the highlighted item "Everybody's Fancy" in much larger text than the rest of the list, which may be useful for facilitating selection and for imparting information to the user.

As discussed earlier, graphical scroll wheels may be implemented to react to scrolling durations. For example, a graphical scroll wheel may appear for a few seconds of scrolling (e.g. the initial three seconds or another appropriate time interval or duration) and then disappear. In some cases, users may be confused to if the scroll wheel function is still enabled or not. Thus, touch screen interface 510 shows an alternative that helps alleviate this confusion by indicating that the scroll wheel function is still enabled by presenting a small scrolling icon 542 that appears in the bottom-right region of touch screen interface 510 when scrolling motion (subsequent motion along the path indicated by a previous full graphical scroll wheel) is detected. The scrolling icon 542 can always appear in a predetermined location, or may move just as the graphical scroll wheel can to follow the input object, avoid the input object, to indicate scrolling direction, or to preset locations. The interaction with the scroll wheel function may thus be comprised of combinations, including interactions with a full graphical scroll wheel image and icons indicating prior graphical scroll wheels. For instance, the interaction with the scroll wheel function can include the small scrolling icon 542 mimicking a small scroll wheel, and may also include arrows (not shown) indicating the scrolling direction.

Figure 6:
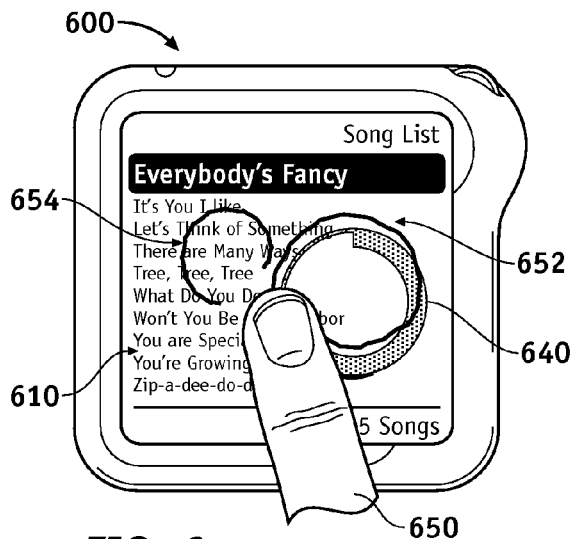
FIG. 6 is a schematic view of an exemplary touch screen interface in accordance with an embodiment of the invention, where the touch screen interface receives subsequent object motion in the sensing region of the touch sensor device.

FIG. 6 is a schematic view of an exemplary electronic system 600 having exemplary touch screen interface 610, where the touch screen interface 610 receives user input in its sensing region. The touch screen interface 610 is showing graphical scroll wheel 640, and an input object 650 (shown as a finger) is shown with two alternate paths 652 and 654. Graphical scroll wheel 640 indicates a path (also termed "scrolling track" or "scrolling path") that is circular; the path is demarked by the outer perimeter and partial inner perimeter of graphical scroll wheel 640. Therefore, touch screen interface 610 interprets (i.e. the process of touch screen interface 610 is adapted such that it interprets) subsequent object motion along that path to be scrolling input, and would cause scrolling of the song list currently displayed behind the graphical scroll wheel 640 in response to such subsequent object motion along that path. In other words, touch screen interface 610 would interpret circular input gestures along the path indicated by graphical scroll wheel 640 as scrolling movements, similar to traditional mechanical scroll wheels.

There are many ways of determining if object motion is along a path, and any one which can be used to gauge user intent to continue along that path is adequate. For example, one simple method is to define motion along the scrolling path as falling within a certain distance from a center of the graphical scroll wheel (e.g. within a certain radius). Another simple method is to use two distances from the center of the graphical scroll wheel to define an annular region within which motion would be considered "along the scrolling path." More complex implementations are also possible, including those based on angular coordinates and dynamic centers, and detailed algorithms of ascertaining user intent based on object motion trajectory or object motion history. Other implementations include defining what is along the path based on electrode design, such as described in U.S. Pub. No. US2004/0252109 A1.

Generally, the subsequent object motion that results in scrolling can be along all or a part of the path, or follow the path multiple times around the graphical scroll wheel (e.g. graphical scroll wheel) 640. In many cases, the amount of scrolling would be based on the distance traveled by the input object(s) (e.g. input object 650) along the path indicated by the graphical scroll wheel (such that a component of distance traveled perpendicular to the path would result in no scrolling, for example), and a simple proportional ratio or other adjustment factor can be used to map distance to amount of scrolling that results. However, other factors such as total distance traveled (including both along and not along the path), speed, angular distance, angular speed, any derivatives or integrals of these factors, some other appropriate factor, or some combination thereof can be used in place or in addition to the distance traveled along the path. In addition, ballistics that changes the adjustment factor based on any of these criteria can be applied, and affect the amount of scrolling that should result. For example, the adjustment factor can be zero for slow speeds to dampen out what may be drift in sensor signals due to environmental changes, a first constant for moderate speeds to map the distance to scrolling in a direct manner, and a higher constant or an exponentially increasing function for higher speeds to enable fast scrolling in response to quick object motion.

Unlike the mechanical scroll wheel, the user does not need to stay exactly within the scrolling track, and object motion substantially along the path can result in scrolling. The circular scrolling motions can wander across the screen somewhat, perhaps crossing into a region interior to the path indicated by the graphical scroll wheel and outside of the outer perimeter of the graphical scroll wheel and still generate scrolling movements. This is useful as the path indicated by a graphical scroll wheel may not always have clear boundaries, as well as when the touch screen interface causes the graphical scroll wheel to become less visible, to move from an original location (but still consider the path along the original location to be the one that causes scrolling instead of a new path that follows the moved scroll wheel), or to disappear all together. An example of this is shown by object motion trail 652 in FIG. 6, which shows a potential set of locations that input object 650 can follow on touch screen interface 610 that is substantially along the path indicated by scroll wheel 640, and still result in scrolling. In contrast, object motion trail 654 shows a set of locations that input object 650 can follow that would not be substantially along the path indicated by scroll wheel 640 and would not cause scrolling. Thus, input object 650 does not need to follow the exact line of the graphical scroll wheel 640 in order to cause scrolling.

Figure 7A:
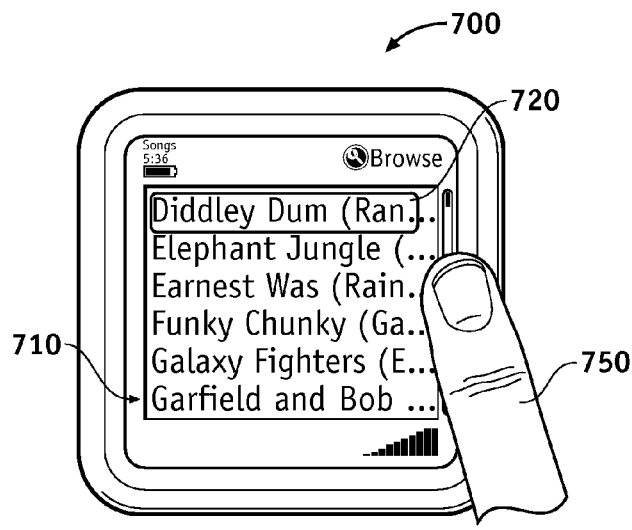
FIGS. 7A-7C are schematic views of an exemplary electronic system having an exemplary touch screen interface in accordance with an embodiment of the invention at different points in time, where the touch screen interface receives object motion corresponding to a scrolling initiation gesture.
Figure 7B:
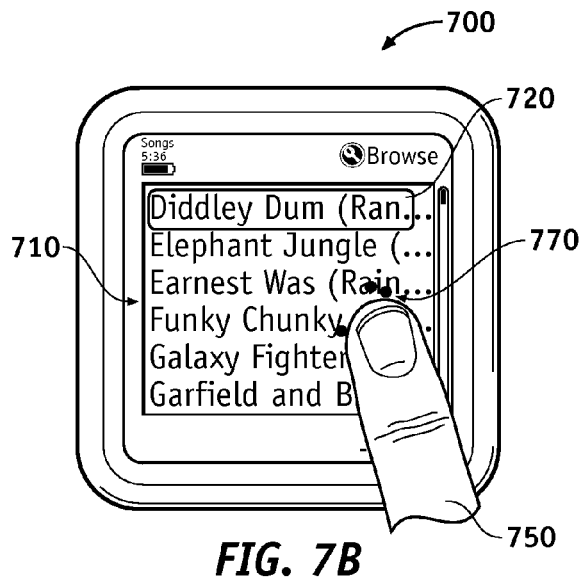
Figure 7C:
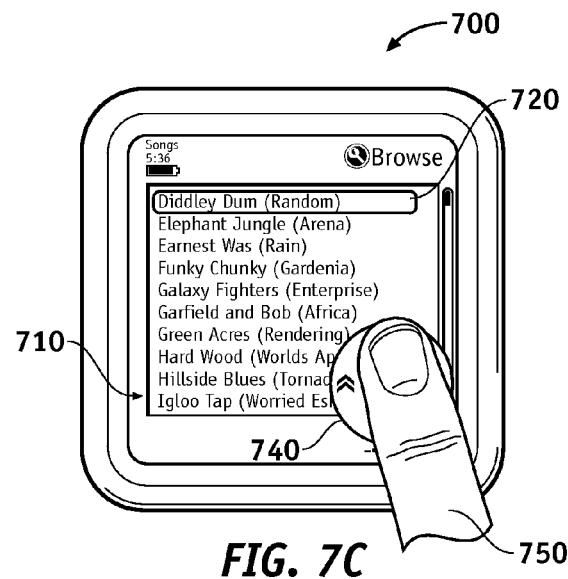

FIGS. 7A-7C are schematic views of an electronic system 700 at different points in time, where touch screen interface 710 of electronic system 700 receives exemplary object motion corresponding to a scrolling initiation gesture. Touch screen interface 710 is showing a song list in a "browse" mode, and highlighter 720 indicates that "Diddley Dum . . . " is currently selected. Touch screen interface 710 supports a method for scrolling that involves an on-demand graphical scroll wheel 740. The graphical scroll wheel 740 can be presented by the touch screen interface 710 in response to a predefined type of user input, such as object motion corresponding to a scroll initiation gesture. FIGS. 7A-7C show one exemplary scroll initiation gesture that involves object motion approaching the touch screen interface 710 and then holding relatively still for a designated amount of time. In this case, the touch screen interface 710 can activate the scroll wheel function and show the graphical scroll wheel 740 after sensing that a user has placed input object 750 (shown as a finger) down on the touch screen interface 710 and has held that input object 750 relatively still for at least a designated amount of time (e.g. three seconds), and recognizing it as a scroll initiation gesture. Alternatively, other scroll initiation gestures can be used in addition to or in place of this approach-and-hold-input-object version. For example, another natural scroll initiation gesture involves object motion that approximates that of the subsequent object motion along the path indicated by the graphical scroll wheel; with this type of scroll initiation gesture, transition from scroll initiation and scrolling can be practically seamless, as the same motion can be used by a user to trigger both the scroll wheel function and scrolling.

FIGS. 7A-7C also show an exemplary precursor image 770, which is shown as dots that appear and roughly trace out a ring in response to the scroll initiation gesture). Precursor images can be used to indicate the impending full image of the graphical scroll wheel, and may be static (e.g. nonmoving dots) or dynamic and changeable (e.g. a series of dots that appear in sequence or appear to rotate).

Touch screen interfaces can be implemented to support more than just scrolling function in response to user input sensable by the touch screen interfaces. When a user input may indicate multiple functions, there are ways to enable the touch screen interface to distinguish between potential user intents, such as via a time requirement. For example, the touch screen interface may be adapted to recognize user touches lasting no more than a certain amount of time (e.g. short touches below some duration, also termed "taps") to indicate selections. Thus, in FIGS. 7A-7C, when in the song play mode, touch screen interface 710 may show a playlist of audio media, and send data to electronic system 700 to cause a piece of music associated with the name or icon touched to play in response to such user input.

However, in such a case where selection and the scroll initiation gesture both entail touches, it may be unclear if the proper response to a touch is to cause selection of a list item or to cause activation of the graphical scroll wheel. This ambiguity can be resolved by imposing a time duration below which selection input must finish and above which scroll wheel activation must last. With such a criterion, even though the touch screen interface may not be able to tell if the user desires to cause selection or to activate the graphical scroll wheel when it first senses a touch, if the touch finishes before that certain amount of time, then it is clear that the user input is meant to be selection; and once enough time has passed without removal of the input, then it is clear that the user input is not meant to be a selection.

A movement requirement can also be applied in addition to or in place of the time requirement. For example, touch screen interface may also support character input, cursor input, menu navigation, and the like. Typically, these types of input would involve relatively larger amounts of object motion. Thus, a maximum amount of distance traveled may be used to distinguish between scroll initiation and other types of input. Alternatively, the criterion may instead be a maximum radius from a touchdown point, a maximum speed, some other position based information, or any combination thereof. Thus, information from the spatial domain, information from the time domain, or any other appropriate domain (e.g. which application is running, etc.), to facilitate distinguishing between different user desires.

Figure 8A:
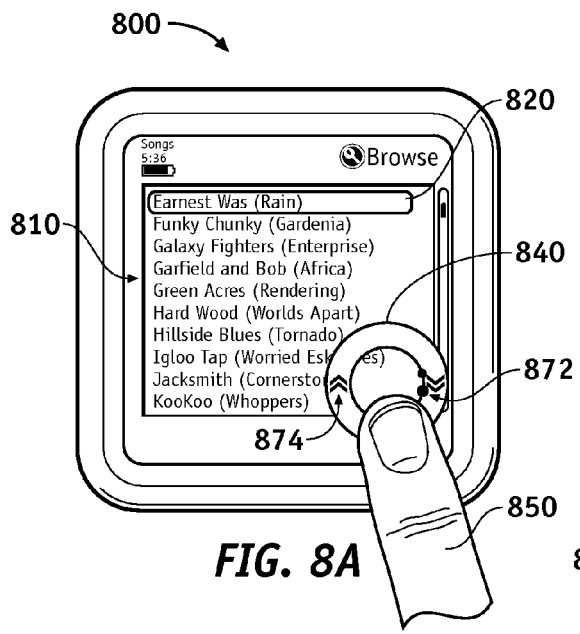
FIGS. 8A-8B are schematic views of an exemplary electronic system having an exemplary touch screen interface in accordance with an embodiment of the invention at different points in time, where the touch screen interface receives subsequent object motion along the scrolling path indicated by the scroll wheel.
Figure 8B:
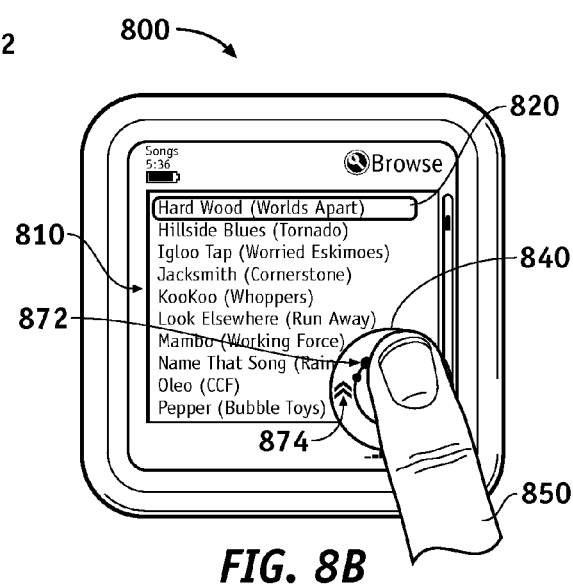

FIGS. 8A-8B are schematic views of an electronic system 800 having a touch screen interface 810, where the touch screen interface 810 receives exemplary subsequent object motion along the scrolling path indicated by the graphical scroll wheel 840. Electronic system 800 and touch screen interface 810 are similar to electronic system 700 and touch screen interface 710 of FIGS. 7A-7C. In FIG. 8A, touch screen interface 810 is displaying a "browse" menu for songs including a list of song titles as well as artists, and a highlighter 820 encircles the entry "Ernest Was (Rain)" to provide one indication of current scroll position.

With the scroll wheel function active, a user can scroll slowly or quickly through the song list by following the path indicated by the graphical scroll wheel 840. In this case, graphical scroll wheel 840 traces out a circular path roughly outlined by the inner and outer perimeters of scroll wheel 840. The user can move input object 850 (shown as a finger) in a clockwise or counterclockwise direction along the path to scroll up or down the list. The response scrolling action can be indicated by the touch screen interface 810 holding the image of highlighter 820 still at the top of the displayed portion of the list and moving the list (i.e. causing items in the list to appear at one end of the list and disappear at another end of the list, and the rest of the items to shift in position appropriately). In this case, as shown by comparison of FIGS. 8A and 8B, the input object 850 moves in a clockwise manner along the path, and this type of subsequent object motion causes the song list to move upwards while highlighter 820 holds still at the top of the displayed portion of the list.

In FIG. 8A, the song list is arranged alphabetically, and the item "Ernest Was (Rain)" is highlighted and "Hard Wood (Worlds Apart)" is in the middle of the list. In FIG. 8A, the clockwise motion of input object 850 about 180 degrees around the path indicated by graphical scroll wheel 840 has resulted in the items from "Ernest Was (Rain)" to "Green Acres (Rendering)" to be removed from the displayed set, "Hard Wood (Worlds Apart)" to move to the top of the list and be highlighted by highlighter 820, other items to move upwards on the display, and items "Look Elsewhere (Run Away)" to Pepper (Bubble Toys)" to appear in the displayed set. Alternatively, instead of moving the list and holding the highlighter still, touch screen interface 810 can move the highlighter along the list.

The touch screen interface 810 can also provide an indication of a current direction of scrolling to appear, such as in the form of arrows 874 that indicate that touch screen interface 810 is processing clockwise subsequent object motion and causing the direction of scrolling associated with clockwise subsequent object motion. Thus, to the user, graphical scroll wheel 840 responds to the scrolling direction. Other directional icons in addition or in place of arrows may be used to indicate the direction that the user is currently scrolling. Touch screen interface 810 can also provide a visual indication of scrolling to the user, such as a series of animated dots 872. In FIGS. 8A-8B, animated dots 872 follow the input object 850 around path indicated by the graphical scroll wheel 840, and thus is also an indication of a current direction of scrolling.

Generally, the user can stop scrolling by moving the input object from the graphical scroll wheel. For example, moving input object 850 from graphical scroll wheel 840 can end the scrolling. This can be any movement away from graphical scroll wheel 840 or the path indicated by graphical scroll wheel 840, even if input object 850 continues to provide object motion sensable by touch screen interface 810. Alternatively, touch screen interface 810 may stop scrolling only in response to movement from the graphical scroll wheel 840 that removes the input object 850 away from the touch screen interface 810—a sufficient distance away from the touch screen interface 810 may be sufficient, or the touch screen interface 810 may require that the movement remove the input object 850 from its sensing region. Touch screen interface 810 may be configured to consider such input to be scroll termination events, and end and deactivate the scroll wheel function in response. Alternatively, touch screen interface 810 may configured to continue the scroll function if the object motion returns to the graphical scroll wheel within a period of time.

The touch screen interface 810 can also adapted (i.e. the processor of touch screen interface 810 can also be adapted) to cause the graphical scroll wheel 840 to disappear. For example, touch screen interface 810 can cause graphical scroll wheel 850 to disappear after a period of time has passed, even though scroll wheel function is still active. Alternatively, touch screen interface 810 can cause the graphical scroll wheel 850 to disappear in response to sensing, after sensing the object motion corresponding to the scrolling initiation gesture, a scrolling termination event. For example, the scrolling termination event can involve any combination of the previously described scrolling termination events.

After the scroll function ends, the size of list entries can stay the same as shown in FIG. 8A-8B, or change in size appropriately. For example, the size can increase to what is shown in FIGS. 7A-7B to facilitate selection if selection is the next likely user input. If the entries were originally the size shown in FIGS. 7A-7B prior to the scroll wheel function becoming active, then the touch screen interface 810 has effectively returned to that size after the scroll wheel function was active.

Figure 9:
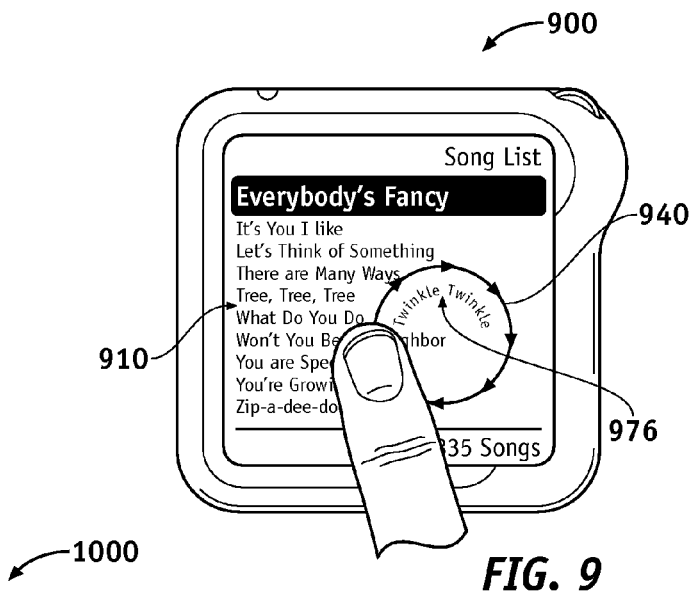
FIGS. 9-11 are schematic views of exemplary touch screen interfaces in accordance with embodiments of the invention, where the touch screen interfaces display information and indications proximate to scroll wheels.
Figure 10:
Figure 11:
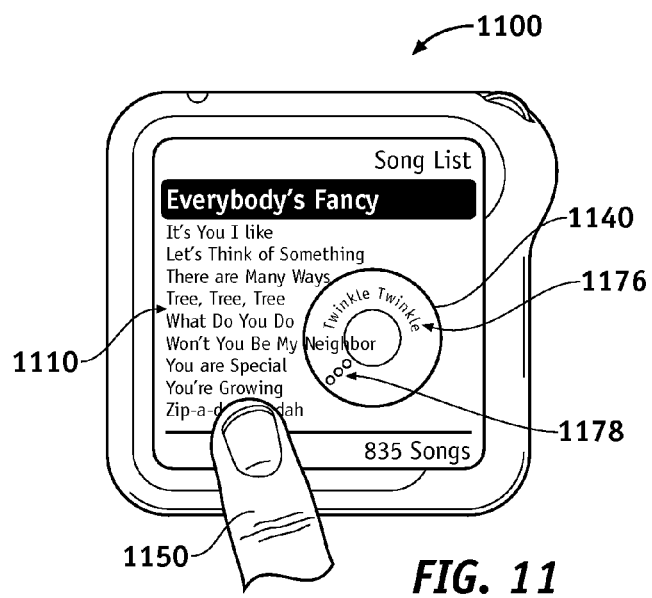

Graphical scroll wheels could take many forms and react in different ways to user actions. FIGS. 9-11 are schematic views of exemplary touch screen interfaces 910, 1010, and 1110 of electronic systems 900, 1000, and 1100. Touch screen interfaces 910, 1010, and 1110 display exemplary information and indications proximate to their respective graphical scroll wheels 940, 1040, and 1140. The touch screen interfaces 910, 1010, and 1110 have been adapted to make a portion of scrollable list of items viewable through their respective graphical scroll wheels 940, 1040, and 1140. This is most clearly seen in FIG. 11, where the word "Neighbor" is almost fully visible through graphical scroll wheel 1140 even though a portion of that word overlaps with graphical scroll wheel 1140. Also, the touch screen interfaces 910, 1010, and 1110 have been adapted to show list of scrollable items as well as information 976, 1076, and 1176 about one of the list of items proximate to the graphical scroll wheel 940, 1040, and 1140. Information 976, 1076, and 1176 as shown is a portion or all of the name of the media that is currently being played ("Twinkle, Twinkle"). However, information 976, 1076, 1176 can also be something else related to scrolling and the set of items, including a repetition of the name of the label of the currently highlighted item (e.g. "Everybody's Fancy"), information about the currently highlighted item (e.g. the artist for the highlighted "Everybody's Fancy"), or information about the currently playing media (e.g. the artist or time remaining for "Twinkle, Twinkle."). In this way, the graphical scroll wheel 940 may be implemented to have near it other information such as the name of the current song in a playlist, the words of the lyrics of the song being played, status messages (e.g. "Song paused", "Select an item to play"), or any other appropriate information.

FIG. 9 shows a graphical scroll wheel 940 that includes a simple circle with arrows that indicate the direction of scrolling. FIGS. 10-11 show graphical scroll wheels 1040, 1140 that has smooth outer and inner perimeter lines, with the outer perimeter being thicker and more visible. Touch screen interfaces 1010, 1110 have also been adapted to cause indications 1077, 1178 to appear proximate to graphical scroll wheels 1040, 1140 as appropriate.

Indication 1077 indicates a current position of scrolling, which reflects the effective "position" of the user within a list or document. In this way, the graphical scroll wheel 1040 appears to a viewer to respond to the scrolling distance much as the scroll bar found in many PC GUIs would. As the user scrolls a list or document, indication 1077 moves along graphical scroll wheel 1040 to reflect the user's current position within the document much as a scroll thumb in a scroll bar would. The size and location of indication 1077 relative to graphical scroll wheel 1040 can provide further information to a viewer, also much as a scroll thumb would. For example, the location of the indication 1077 relative to the "due north" or "12 o'clock" position can indicate what part of the scrollable set of items is displayed, and the relative size of indication 1077 compared to the entire length of the graphical scroll wheel 1040 can indicate how much of the scrollable set of items is displayed.

Indication 1178 indicates the location of the object motion associated with scrolling, and appears proximate to the graphical scroll wheel 1140. Indication 1178 is illustrated in FIG. 11 as pointing toward where touch screen interface 1110 considers as the location of input object 1150 (shown as a finger). In the cases where multiple input objects are sensable by a touch screen interface, having such an indication can help the user provide the input that would cause the desired scrolling, selection, or other control actions. In addition to what is shown in FIG. 11, a graphical scroll wheel can also respond to the user in other ways to indicate the location of the object motion. For example, a graphical scroll wheel may trace the input object within the scroll wheel or move the graphical scroll wheel to be centered underneath the input object, as discussed earlier.

In general, graphical scroll wheels can be implemented to respond to the scrolling speed. For example, the graphical scroll wheel may become more opaque (darker) when the user causes scrolling to occur very quickly and more transparent (lighter) when the user causes scrolling to occur slowly, or vice versa. When the user is scrolling slowly, the user is more likely to focus on reading line items and the solid or darker scroll wheel may obstruct search items. Thus, the graphical scroll wheel can respond by increasing the transparency so that items underneath the scroll wheel are more visible when the scrolling action is slower. However, if the touch screen interface displays near the graphical scroll wheel an indication of the currently highlighted item, then the user may appreciate a solid or darker scroll wheel to facilitate easier viewing of the indication. This shifting in scroll wheel transparency accommodates the user's shift from global searching (fast section-by-section scrolling) to local scrolling (slow line-by-line scrolling). Alternatively or in addition, the graphical scroll wheel may be implemented to change in size (e.g. expand and shrink) depending upon the scrolling speed. The graphical scroll wheel can expand during slower scrolling movement, and shrink when scrolling movement is faster. This may be desirable in cases where users are more likely to make larger circles when they are scrolling slowly. The graphical scroll wheel can also be smaller during slower scrolling movement, and be larger when scrolling movement is faster. This may be desirable to reduce any negative effects a larger graphical scroll wheel may have on the perusing of the scrollable list of items. A variety of other scroll wheel characteristics, including scroll wheel shape, location, animation, and any other appropriate characteristic may be implemented to change with scrolling speed. Touch screen interfaces supporting such graphical scroll wheels would then be adapted to change one or more scroll wheel characteristics (e.g. size, transparency, etc.) in response to user input, such as in response to change in a speed of the subsequent object motion along the scrolling path.

FIGS. 12A-12C show a graphical scroll wheel 1240 displayed on a touch screen interface 1210 at different points in time. In the span of time shown by FIGS. 12A-12C, the touch screen interface 1210 receives exemplary subsequent object motion from input object 1250 (shown as a finger) along a path indicated by graphical scroll wheel 1240, and provides indications 1272 and 1274 proximate to graphical scroll wheel 1240.

The touch screen interface 1210 is adapted to cause indications 1272 and 1274 to appear. In FIGS. 12A-12C, input object 1250 is moving in a clockwise manner, and so the arrows (">>") of indication 1274 points upwards on the left side of graphical scroll wheel 1240 and downwards on the right side of graphical scroll wheel 1240, which reflects a current direction of object motion and thus the direction of scrolling. The dots of indication 1272 follow input object 1250 around the path indicated by graphical scroll wheel 1240 and are larger closer to the input object 1250; this also provides visual feedback about the motion of input object 1250 and the direction of scrolling. The dots of indication 1272 are animated, and thus can also provide an indication of the speed of scrolling by moving faster as input object 1250 moves faster. The arrows and dots of indications 1272 and 1274 are a couple of example markers that touch screen interfaces supporting graphical scroll wheels can use for the indications. Other markers, of different sizes and shapes, inside or outside the graphical scroll wheel, animated or not, provide other ready alternatives.

Generally, touch screen interfaces providing graphical scroll wheels can selectively or permanently display and support touch-sensitive navigation controls near the scroll wheels. In other words, the touch screen interface can always display navigation control regions (also "navigation control zones"), or only enable the navigation control regions when particular criteria are satisfied. These touch-sensitive navigation controls can be triggered by user input in particular navigation control regions. For example, the touch screen interface can be adapted to respond to sensed object motion indicating contact of or indicating removal of contact from a navigation control region. As discussed earlier, information from the spatial domain, the time domain, or any other appropriate domain (e.g. which application is running, etc.) can be used in distinguishing between user desires. For example, maximum touchdown time, maximum distance traversed, limiting object motion to be within just one region, etc. can be used to distinguish when a user wants to trigger a function associated with a navigation control region or not. The navigation control regions and any proximate indications can be made to provide information or control options that are static or that change dynamically to support other functionality, thus making the graphical scroll wheels more interactive. For example, when a touch screen interface provides a list of songs that the user can select to play, the graphical scroll wheel can have four regions for initiating scrolling, forward, play, and back. Thus, the touch screen interface can be adapted to show at least one navigation control region proximate the graphical scroll wheel. Embodiments supporting navigation control regions can provide many benefits, including solid state solutions, configurable buttons and an interactive graphical scroll wheel that is particularly suitable for both MP3 and video entertainment devices.

For example, FIGS. 13A-13C shows a touch screen interface 1310 with four exemplary, roughly wedge-shaped navigation control regions 1382, 1384, 1386, and 1388 proximate to a graphical scroll wheel 1340. These navigation control regions 1382, 1384, 1386, and 1388 are shown within and along graphical scroll wheel 1340, and are demarked visually by a combination of an inner, circular inactive region and an "X" that separates the four navigation control regions 1382, 1384, 1386, and 1388.

As shown in FIG. 13A, these navigation control regions 1382, 1384, 1386, 1388 support scrolling and media controls including forward, pause, and back commands when a piece of media (e.g. music) is available. The regions can be demarked by symbols indicative of the supported commands. For example, navigation control region 1382 shows a marker indicating play, navigation control region 1384 shows a marker indicating reverse, navigation control region 1386 shows a marker indicating scroll wheel function, and navigation control region 1388 shows a marker indicating fast forward. Thus, the touch screen interface 1310 is adapted to perform a navigation task different from scrolling in response to sensing user input in the navigation control regions 1382, 1384, and 1388. This embodiment, with its selection of media-related functions, may be especially useful for personal digital entertainment systems (PDEs) such as video systems and music players (e.g. MP3 players).

Navigation control region 1386 is a designated starting region for scrolling in an upper quadrant of the graphical scroll wheel 1340. Navigation control region 1386 contains a scroll wheel symbol to provide an indication of its function. To activate the scroll wheel function associated with region 1386, the touch screen interface 1310 can be implemented to recognize a user tap, touch of some duration, or both, as scroll initiation gestures. Although the touch screen interface 1310 can be configured to accept subsequent object motion beginning anywhere along the path for scrolling, in many cases it will be configured to require that the subsequent object motion also start in region 1386, and perhaps as what a user would view as a continuation of the stroke that began with the scroll initiation gesture. The subsequent object motion can then proceed along the path indicated by graphical scroll wheel 1340 to cause scrolling. Alternatively, the touch screen interface 1310 can be configured to accept subsequent object motion beginning anywhere as long as it takes place within a certain amount of time from the scroll initiation gesture, or some other appropriate criteria. The scrolling can end in response to the object motion moving off of the path indicated by the graphical scroll wheel 1340, such as toward the center of the graphical scroll wheel 1340 or off of the touch screen interface 1310. The scroll wheel function can terminate or not, depending on if the touch screen interface 1310 is configured to consider such input to be scroll termination gestures.

To lay out a sequence of exemplary events that can take place on touch screen interface 1310, the user can initiate the scroll wheel function and then cause scrolling by placing an input object 1350 (shown as a finger) in navigation control region 1386. The placement may need to meet particular criteria in the time or space domain or not, and the touch screen interface 1310 can cause that region 1386 to highlight in response to the input to provide visual feedback or not. The user sliding the input object 1350 in a clockwise direction after placing the input object 1350 in navigation control region 1386 can cause scrolling down through the song list, and the touch screen interface 1310 can provide visual feedback by moving and shifting the list or the highlighted list item as appropriate. The visual appearance of the graphical scroll wheel 1340 can also change to indicate scrolling and to reflect the object motion; for example, the graphical scroll wheel can display arrows indicating the direction of object motion and provides dots that follow the input object 1350 along the wheel, such as shown in FIGS. 12A-12C. The user can stop scrolling by lifting the input object 1350 from the graphical scroll wheel 1340. In response, the graphical scroll wheel 1340 can change its appearance and the navigation control regions proximate to the graphical scroll wheel 1350 can change. For example, the touch screen interface 1310 can cause the graphical scroll wheel 1340 and navigation control regions to return to the four navigation control regions (also "navigation control zones") associated with scrolling, forward, play, and back commands.

To play the media that correlates to a highlighted list item (not shown) on the touch screen interface, such as the song that correlates to the highlighted track name, a user can touch or tap on a navigation control region associated with the play function (i.e. the "Play area" or "Play region"). The Play region can also provide visual response to the user command by highlighting in response to the user input. This is shown in FIGS. 13A-13C, where the touch screen interface 1310 receives object motion from input object 1350 that corresponds to an activation of the play function shown in navigation control region 1382. In FIG. 13B, region 1382 highlights to provide feedback to a user of the activation of the play function; no feedback or other feedback, such as audio or haptic feedback, may be used in place of or in addition to the highlighting to indicate the activation. Alternatively, if the function is not activated upon sensed contact but rather activated after sustained sensed contact, at liftoff, or in response to another appropriate object motion input, feedback at sensed contact may be provided to indicate the function that would be activated should that activation event occur. For example, if the function activates upon liftoff, highlighting may indicate which navigation function region and associated function would be activated should liftoff occur at that point.

In FIG. 13C, the play function is active and media is playing, and the marker region 1382 changes from one indicating "play" to one indicating "pause" in response. Thus, the "play area" can change to a "pause area" during song play, and the visual appearance of the graphical scroll wheel 1340 and navigation control region 1382 can change to reflect the changed option. The touch screen interface 1310 can also show information about the song being played.

There are many ways to stop the play of the media in addition to activating the "pause" function. For example, touching a "Menu" icon (not shown) during play of a song can change the display back to the list of songs and also stop the music in response.

FIGS. 14A-14C show an exemplary touch screen interface 1410 with an exemplary text-entry area 1489 demarked by graphical scroll wheel 1440. The touch screen interface 1410 is adapted to receive character input in the text-entry area 1489. The touch screen interface 1410 or the electronic device that it communicates with is adapted to perform character recognition on the character input received in the text-entry area 1489, to identify an applicable portion of a scrollable set of items associated with the character input received in the text-entry area 1489, and to cause the touch screen interface to show the applicable portion of the scrollable list. Thus, the text-entry area 1489 can be used to provide touch-sensitive navigation control. Embodiments with text-entry areas can thus provide faster navigation, improved playlist editing, solid state solutions, and configurable buttons, along with an interactive graphical scroll wheel.

Supporting text-input areas allows other methods of navigation and selection through sets of selectable items, and supplement or take the place of other scrolling methods. For example, as shown in FIGS. 14B-14C, a user can indicate a letter of the alphabet in the text-entry area by writing the character with a finger or other input object 1450 (shown in FIG. 14B as an input object 1450 tracing out a curve 1456 in text entry area 1489). The text-entry area 1489 can provide visual feedback tracking the sensed object motion associated with the input as the user traces the character input. The text-entry area can also highlight to indicate touch. In response to the character input and the recognition of the character(s) input, the applicable portion of the list associated with the character can be shown, and an appropriate entry can be highlighted. For example, in response to an inputted "a" as being traced out in FIG. 14C, touch screen interface 1410 can provide or jump to the first entry in an alphabetized song list which begins with the letter "a," and highlight it as the currently selected list item. The rest of the song list can follow in alphabetical order.

Touch screen interfaces that supported text-entry areas can also support navigation control regions. For example, touch screen interface 1410 supports navigation control regions 1482, 1484, 1486, 1488 and displays markers in those regions to indicate their location and their functions. Navigation control regions 1482, 1484, 1486, and 1488 function similarly to navigation control regions 1382, 1384, 1386, and 1388 shown in FIGS. 13A-13C. These markers can be displayed always, or be displayed selectively when the functions presented are available. For example, media selection functions can be shown or emphasized in some way when a list of media from which to select is shown.

Figure 15A:
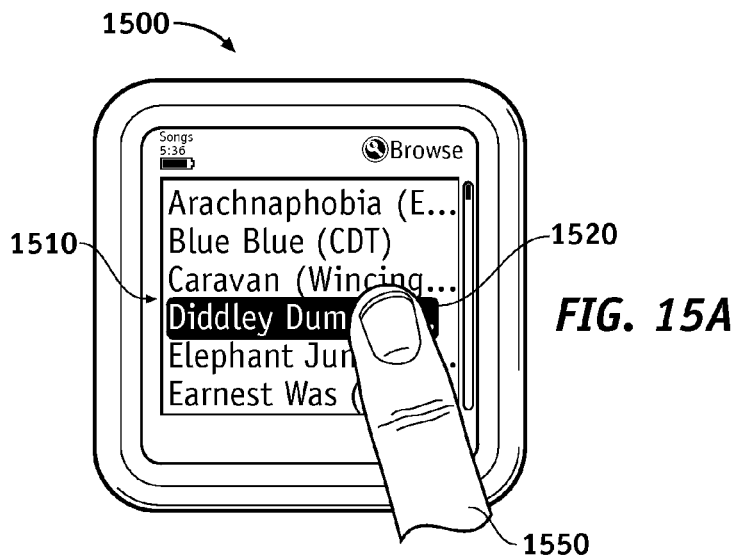
FIGS. 15A-15C are schematic views of an exemplary touch screen interface in accordance with an embodiment that supports an alternate scrolling method to the scroll wheel method.
Figure 15B:
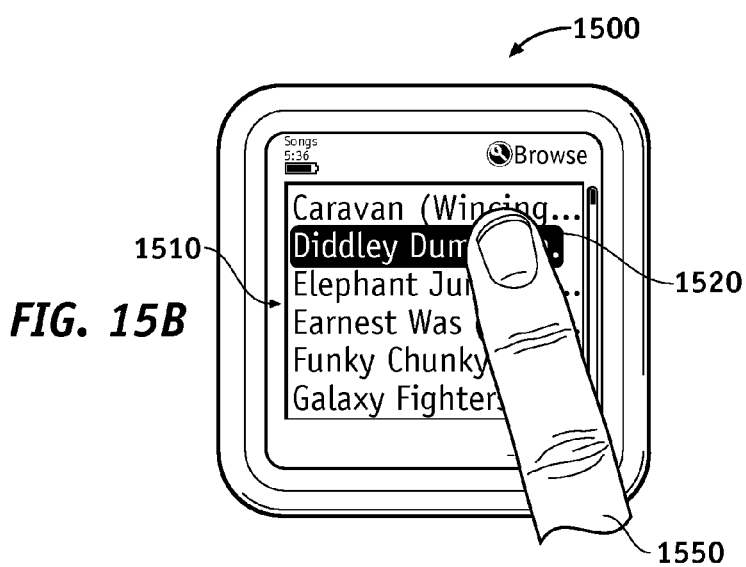
Figure 15C:
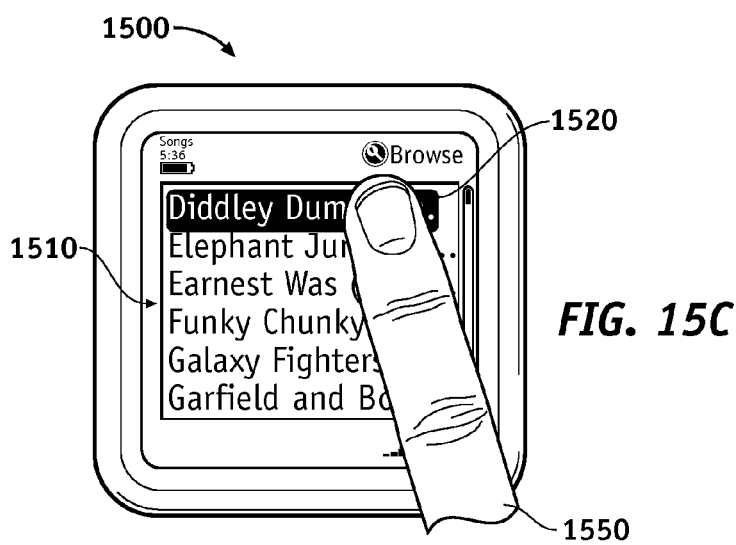

Scrolling can be enabled using many different alternative methods to the graphical scroll wheel method, and an electronic system can choose to enable one or more of these alternatives. FIGS. 15A-15C show an electronic system 1500 having a touch screen interface 1510 in accordance with an embodiment of the invention, where touch screen interface 1510 supports an exemplary alternate scrolling method to the graphical scroll wheel method. This exemplary alternate scrolling method can be used in place of or to complement the scroll wheel method.

One alternate scrolling method involves touching an entry in a scrollable set and moving it to bring other entries in the set into view. For example, FIGS. 15A-15C shows a user touching the "Diddley Dum . . . " item 1520 in the displayed with an input object 1550 (shown as a finger) and sliding input object 1550 upwards to bring other entries into view (e.g. "Funky Chunky . . . " and "Galaxy Fighter . . . " in FIG. 15B and "Garfield and Bo . . . " in FIG. 15C). The touched entry 1520 can move with the object motion provided by input object 1550, and can track the position of the input object. The highlighting of the touched item 1520 can also change to indicate touch. This method of scrolling may be particularly advantageous for performing shorter scrolls. The scrolling can end when the user lifts the input object 1550 from the touch list item 1520. The highlighting of the item 1520 can also change to indicate no touch.

Figures 16A, 16B:
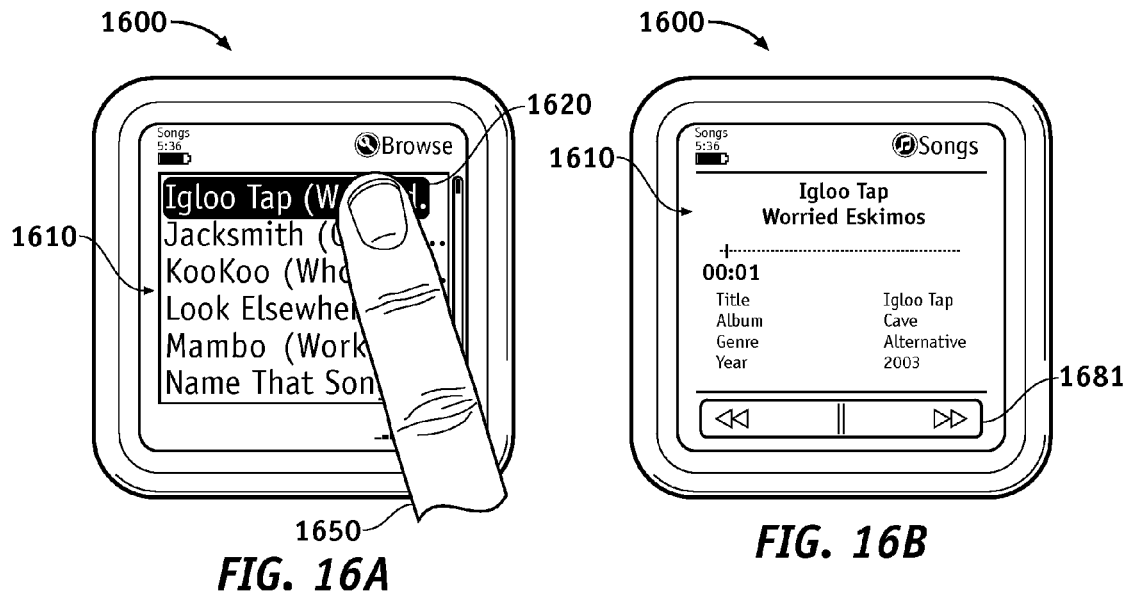
FIGS. 16A-16B are schematic views of an exemplary touch screen interface in accordance with an embodiment of the invention, where in FIG. 16A the touch screen interface receives object motion corresponding to selection and in FIG. 16B the touch screen interface has changed the display in response.

FIGS. 16A-16B are schematic views of an electronic system 1600 having exemplary touch screen interface 1610. In FIG. 16A, a touch screen interface 1610 receives exemplary object motion corresponding to selection in the sensing region of touch screen interface 1610. In FIG. 16B, touch screen interface 1610 changes the display on the touch screen interface 1610 in response to the selection.

Selection is a useful function to support, and this can be accomplished a variety of ways. One method is by recognizing the simple touching or tapping of the desired item. For example, to select one of a set of displayed tracks of media to play, the user can tap or touch on the title or other representation of the desired track within the set. The selection can occur at touchdown, after a timeout, or at liftoff. Information from the spatial domain, time domain, or any other appropriate domain (e.g. which application is running, etc.), can also be used to facilitate distinguishing between if selection is desired or not.

In FIG. 16A, an input object 1650 (shown as a finger) taps on the item 1620 ("Igloo Tap . . . ") on touch screen interface 1610. The item 1620 changes in highlight to indicate the selection, and the touch screen interface 1610 sends information to electronic system 1600 to cause the playing of the media associated with item 1620. During the playing of the media, the touch screen interface 1610 can change the display and the touch screen controls enabled to what are appropriate for the function. For example, as shown in FIG. 16A, the touch screen interface 1610 can show information about the media being played, what portion of the media is being played relative to the beginning and the length of the track, a soft control for returning to the list of songs, and additional soft controls 1681 for pause, fast-forward, and fast-reverse. Depending on factors such as the type of item selected and the type of electronic system, the response to a selection can differ from what is described above to facilitate interaction with such an item. Similarly, the formatting and content of any information and controls that are displayed or enabled after selection can change with factors such as the type of item selected and the type of electronic system.

Figure 17:
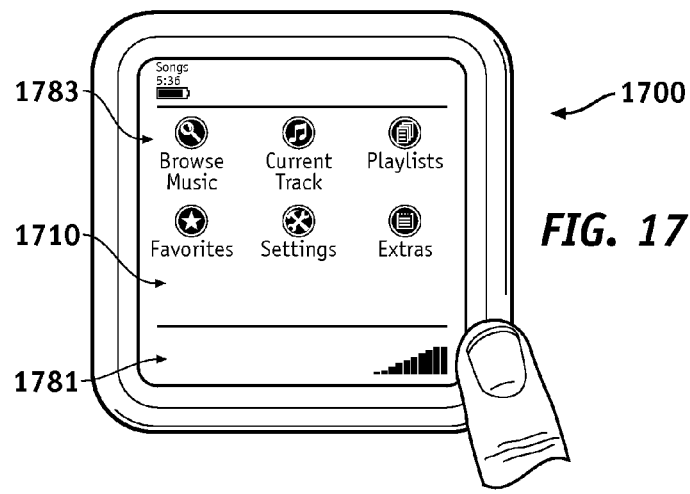
FIGS. 17-18 are schematic views of other exemplary graphical user interfaces usable with touch screen interfaces in accordance with embodiments of the invention.
Figure 18:
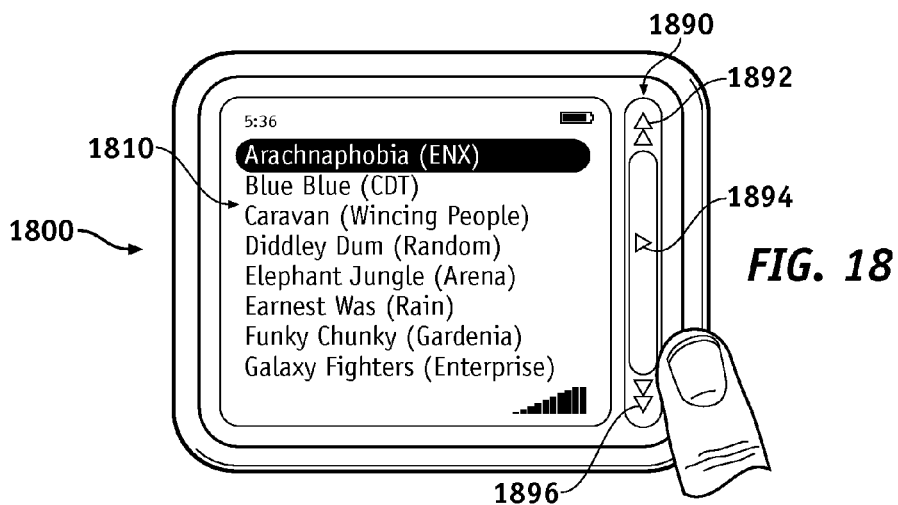

FIGS. 17-18 are schematic views of other exemplary GUIs usable with touch screen interfaces in accordance with embodiments of the invention. FIG. 17 shows an embodiment implemented to provide full-screen functionality, on demand scroll wheel, and context-sensitive controls. With this embodiment, the touch screen interface 1710 of electronic system 1700 can support changeable touch-sensitive controls 1783 and on-demand navigation controls (not shown). Navigation among the different controls can occur by any of the methods described herein, regardless of if it uses a graphical scroll wheel or not.

Users can interact with the touch-sensitive controls, such as to navigate menus by touching the applicable icon on the touch screen. For example, touching or tapping the "Browse Music" icon can trigger the browsing function; the icon can highlight to provide visual feedback. The function that is selected by touching can be an entryway into a submenu with different controls and options. For example, selecting the "Browse Music" icon can lead to a submenu showing different methods of browsing. Electronic system 1700 and touch screen interface 1710 can support many menu layers of different types. For example, a "Track" option under "Browse Music" can lead to a scrollable list when tapped or touched. This scrollable list can be manipulated in any or all of the ways described herein, and which enables the user to browse by track name, genre, artist, or any other track characteristic. The track names in a list of tracks accessed by selecting "Track" can be ordered alphabetically.

Selection can be indicated by highlighting what is touched or activated. Alternatively, the touch screen interface 1710 can change what is displayed without highlighting. For example, touch screen interface 1710 can respond by shifting what is displayed from a set of menu items to a displayed list of songs when "Track" is selected without highlighting the icon region of "Track." The different ways of indicating selection can be mixed in the same GUI. For example, selecting "Track" within the submenu for "Browse Menu" may lead to a list being displayed without highlighting while selecting "Browse Menu" may lead to highlighting of the icon. There can also be multiple levels of selection, with different indications to note what level of selection to the user. For example, the system may distinguish between "selected and not touched" and "selected and touched" in responding to user input and in providing feedback to a user; in such as case, an encircled but not highlighted item can indicate "selected and not touched" and an encircled and highlighted item can indicate "selected and touched."

In another embodiment, such as the one shown in FIG. 18, virtual buttons are provided by touch screen interface 1810 of electronic system 1800. In this embodiment, the GUI can include a touch sensitive control bar 1890 with context-sensitive controls 1892, 1894, 1896. The control bar can support on-demand scrolling as another alternate scrolling method that can be used in place of or in conjunction with scroll wheel functionality. A user can use the control bar 1890 to scroll short or long distances.

Control bar 1890 can enable multiple scrolling methods different from the scroll wheel method that can be used in place of or to complement scrolling via the scroll wheel function. As a first option for scrolling, the upper and lower ends of the touch-sensitive scroll bar 1885 include context-sensitive controls 1892 and 1896 that can be used for line-by-line scrolling. Arrows pointing upwards and downwards on the ends to indicate the location of these context-sensitive controls 1892 and 1896 and their then-associated functions. To scroll upwards, a user can touch or tap on the upper end of the control bar. To scroll downwards, the user can touch or tap on the lower end of the control bar. The context-sensitive control activated by the user can change in appearance (such as by changing contrast) and the highlight indicating the selected item can move to indicate the touch and command. Line-by-line scrolling may be especially useful for scrolling shorter distances.

As a second option for scrolling, the touch-sensitive control bar 1885 can support "swiping" type of scrolling. To activate the "swiping" type of scrolling, the user can quickly run a finger or other input object upwards or downwards along the control bar to scroll in the desired direction, much as one may swipe a dial, wheel, or track ball to turn it. "Swiping" type of scrolling may be especially useful for scrolling longer distances.

A visual clue, such as dots, could appear in control bar 1890 to indicate that the system is scrolling. The visual clue can also provide additional information such as the direction and speed of scrolling. For example, a series of moving dots of different sizes can indicate scrolling speed using motion and the direction of scroll using the sizes. The "swiping" type of scrolling can also simulate turning a knob or wheel that has friction and inertia by responding with faster scrolling at first (such as by scrolling more lines at the beginning), gradually slowing down (such as by scrolling fewer and fewer lines per unit time), and eventually coming to a stop. The list of entries can move while the highlighter stays stationary at higher scroll speeds, and the highlighter can move while the list stays still at lower scroll speeds. This may help enhance the simulation for the user. This simulation may be easier for the user to understand, as it models observations the user may have made of the physical world.

To select a highlight song for play, the user can touch or tap the context-sensitive control 1885 that supports a "play" virtual button as shown in FIG. 18. The "play" marking on the virtual button can change in appearance (e.g. in contrast) to indicate the touch. The change can also have a transitory period and vary during that period; for example, the touch screen interface 1810 can provide a stronger contrast in response to touch and gradually fading after the touch leaves the context-sensitive control 1885

The context-sensitive controls can change. For example, the context-sensitive control 1885 can support a "play" button when a set of playable media is displayed, and then change to support another function such as "pause" after a media has been selected for play and is playing. The information shown on the touch screen interface 1810 can also change. For example, the information can provide more data about the piece of media being played.

It should also be understood that while the embodiments of the invention are to be described herein the context of a fully functioning proximity sensor device, the mechanisms of the present invention are capable of being distributed as a program product in a variety of forms. For example, the mechanisms of the present invention can be implemented and distributed as a proximity sensor program on a computer-readable signal bearing media. Additionally, the embodiments of the present invention apply equally regardless of the particular type of computer-readable signal bearing media used to carry out the distribution. Examples of signal bearing media include: recordable media such as memory cards/sticks/modules, optical and magnetic disks, hard drives.

Thus, the embodiments of the invention teach a touch screen interface and method that improves system usability by enabling a user to easily cause scrolling on a display screen using a touch sensor device. The embodiments of the present invention provide a display screen, a touch sensor device, and a processor coupled to the display screen and the touch sensor. The processor is adapted to cause a scroll wheel that indicates a scrolling path to appear on the display screen selectively, such as in response to the touch sensor sensing object motion that corresponds to a scrolling initiation gesture. The processor is further adapted to cause scrolling on a display screen selectively, such as in response to the touch sensor sensing subsequent object motion along the scrolling path after the touch sensor has sensed the object motion corresponding to the scrolling initiation gesture. The present invention thus allows the display screen to provide a more versatile graphical user interface (GUI), a benefit resulting from having available additional space when the graphical scroll wheel is not shown. The present invention also enables the electronic system to allow the user to scroll in an intuitive manner even as it reduces the chances of accidental scrolling.

The embodiments and examples set forth herein are presented in order to best explain the invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. A touch screen interface for an electronic system, the touch screen interface comprising:
   a display screen;
   a touch sensor proximate to the display screen, the touch sensor adapted to sense object motion in a sensing region, wherein the sensing region overlaps at least part of the display screen; and
   a processor, the processor coupled to the display screen and the touch sensor, wherein the processor is adapted to cause a scroll wheel indicating a substantially circular scrolling path to appear on the display screen in response to the touch sensor sensing object motion corresponding to a scrolling initiation gesture, and wherein the processor is further adapted to cause scrolling in response to the touch sensor sensing, after sensing the object motion corresponding to the scrolling initiation gesture, subsequent object motion along the substantially circular scrolling path;
   wherein the subsequent object motion comprises a sliding object motion substantially following at least a portion of the substantially circular scrolling path.

2. The touch screen interface of claim 1 wherein both object motion corresponding to the scrolling initiation gesture and subsequent object motion along the scrolling path consist of motion of a single object.

3. The touch screen interface of claim 2 wherein the processor is further adapted to cause the scroll wheel to appear proximate to a position of the object motion corresponding to the scrolling initiation gesture.

4. The touch screen interface of claim 1 wherein the touch sensor is stacked with the display screen and wherein the touch sensor senses capacitively.

5. The touch screen interface of claim 1 wherein the processor is further adapted to cause an indication of a current position of scrolling to appear on the display screen, proximate to the scroll wheel.

6. The touch screen interface of claim 1 wherein the processor is further adapted to cause an indication of a current direction of scrolling to appear on the display screen.

7. The touch screen interface of claim 1 wherein the processor is further adapted to identify a direction of the subsequent object motion and to cause scrolling in a way corresponding to the direction of the subsequent object motion.

8. The touch screen interface of claim 7 wherein a clockwise direction of the subsequent object motion corresponds to scrolling in one of an upwards way and a rightwards way, and wherein a counter-clockwise direction of the subsequent object motion corresponds to scrolling in one of a downwards way and a leftwards way.

9. The touch screen interface of claim 1 wherein the processor is further adapted to cause the display screen to show a list of items, and wherein the processor is further adapted to cause the display screen to show, proximate to the scroll wheel, information about a highlighted one of the list of items.

10. The touch screen interface of claim 1 wherein the processor is further adapted to cause the scroll wheel to disappear after a period of time has passed, and wherein the processor is further adapted to cause scrolling in response to the touch sensor sensing, after causing the scroll wheel to disappear, subsequent object motion along the scrolling path.

11. The touch screen interface of claim 1 wherein the processor is further adapted to cause the scroll wheel to disappear in response to the touch sensor sensing, after sensing the object motion corresponding to the scrolling initiation gesture, a scrolling termination event.

12. The touch screen interface of claim 11 wherein the scrolling termination event comprises an event selected from the group of events consisting of: a passage of a duration of time after an appearance of the scroll wheel, a lack of object motion along the scrolling path for some time, ceased object presence proximate to the scroll wheel for some time, and ceased object presence in the sensing region for some time.

13. The touch screen interface of claim 1 wherein the processor is further adapted to change a characteristic of the scroll wheel in response to a change in a speed of the subsequent object motion along the scrolling path.

14. The touch screen interface of claim 13 wherein the characteristic is visual, and is selected from a set of characteristics consisting of a size of the scroll wheel and a transparency of the scroll wheel.

15. The touch screen interface of claim 1 wherein the scroll wheel demarks a text-entry area, and wherein the touch sensor is further adapted to receive character input in the text-entry area, and wherein the processor is further adapted to perform character recognition on the character input received in the text-entry area and identify an applicable portion of a scrollable list associated with the character input received in the text-entry area, and wherein the processor is further adapted to cause the display screen to show the applicable portion of the scrollable list.

16. The touch screen interface of claim 1 wherein the processor is further adapted to cause the display screen to show a navigation control region along the scroll wheel, and wherein the processor is further adapted to perform a navigation task different from scrolling in response to the touch sensor sensing user input in the navigation control region.

17. The touch screen interface of claim 1 wherein the object motion corresponding to the scrolling initiation gesture comprises object motion approaching the display screen and then holding relatively still for a designated amount of time.

18. The touch screen interface of claim 1 wherein the processor is further adapted to make a portion of a scrollable list of items viewable through the scroll wheel.

19. A portable electronic system configured to provide a graphical user interface supporting scrolling, the portable electronic system comprising:

a display screen, the display screen adapted to display a scrollable set of items;

a touch sensor stacked with the display screen, the touch sensor adapted to sense object motion in a sensing region, wherein the sensing region overlaps at least part of the display screen; and a processor, the processor coupled to the display screen and the touch sensor, wherein the processor is adapted to cause a scroll wheel indicating a substantially circular scrolling path to appear on the display screen in response to the touch sensor sensing object motion corresponding to a scrolling initiation gesture, wherein the processor is further adapted to cause scrolling through the scrollable set of items in response to the touch sensor sensing, after sensing the object motion corresponding to the scrolling initiation gesture, subsequent object motion along the substantially circular scrolling path, and wherein the processor is further adapted to cause the scroll wheel to disappear.

20. The portable electronic system of claim 19 wherein the touch sensor comprises a plurality of conductive sensor electrodes adapted to sense capacitively; and a plurality of conductive routing traces connected to the plurality of conductive sensor electrodes and coupled to the processor, wherein the processor is further adapted to control the touch sensor by driving the plurality of conductive sensor electrodes electrically using the plurality of conductive routing traces.

21. The portable electronic system claim 19 wherein the processor is further adapted to cause the scroll wheel to disappear after a period of time has passed, wherein the processor is further adapted to cause scrolling in response to the touch sensor sensing, after causing the scroll wheel to disappear, additional subsequent object motion along the scrolling path.

22. The portable electronic system of claim 19 wherein the processor is further adapted to cause the scroll wheel to disappear in response to the touch sensor sensing, after sensing the object motion corresponding to the scrolling initiation gesture, a scrolling termination event.

23. A method of enabling scrolling in an electronic system having a touch screen, the method comprising:

displaying a set of scrollable items on the touch screen;

sensing object motion proximate to the touch screen;

determining if the object motion corresponds to a scrolling initiation gesture and causing a scroll wheel indicating an annular scrolling path to appear on the display screen if the object motion corresponds to the scrolling initiation gesture;

sensing subsequent object motion proximate to the touch screen, the subsequent object motion occurring after sensing the object motion corresponding to the scrolling initiation gesture; and determining if the subsequent object motion substantially follows the annular scrolling path, and causing scrolling through the set of scrollable items if the subsequent object motion substantially follows the scrolling path.

24. The method of claim 23 wherein sensing object motion proximate to the touch screen comprises sensing object positions over time and calculating object motion from the object positions over time, and wherein sensing the subsequent object motion proximate to the touch screen comprises sensing subsequent object positions over time and calculating the subsequent object motion from the subsequent object positions.

25. The method of claim 23 wherein causing the set of scrollable items to scroll if the subsequent object motion substantially follows the scrolling path comprises:

determining a direction of the subsequent object motion; and causing scrolling in a way corresponding to the direction of the subsequent object motion.

26. The method of claim 23 further comprising:

causing the scroll wheel to disappear in response to a scroll wheel disappearance event.

27. The method of claim 26 wherein the scroll wheel disappearance event comprises passage of a period of time after causing the scroll wheel to appear.

28. The method of claim 6 wherein the scroll wheel disappearance event is a scrolling termination event, and wherein causing the scroll wheel to disappear comprises:

identifying the scrolling termination event after sensing the object motion corresponding to the scrolling initiation gesture; and causing the scroll wheel to disappear in response to identifying the scrolling termination event.

29. The method of claim 28 wherein the scrolling termination event comprises an event selected from the group of events consisting of: a passage of a duration of time after an appearance of the scroll wheel, a lack of object motion along the scrolling path for some time, ceased object presence proximate to the scroll wheel for some time, and ceased object presence in a sensing region of the touch screen for some time.

30. The method of claim 23 further comprising causing an appearance of a precursor image indicative of an imminent appearance of a full image of the scroll wheel if the object motion corresponds to the scrolling initiation gesture.

\* \* \* \* \*